(12) United States Patent
Subramanian

(10) Patent No.: US 9,043,384 B2
(45) Date of Patent: May 26, 2015

(54) TESTING OF CLIENT SYSTEMS CONSUMING CONTRACTUAL SERVICES ON DIFFERENT SERVER SYSTEMS

(75) Inventor: Velmurugan Subramanian, Kudankulam (IN)

(73) Assignee: Oracle International Corporation, Redwood Shores, CA (US)

( * ) Notice: Subject to any disclaimer, the term of this patent is extended or adjusted under 35 U.S.C. 154(b) by 1129 days.

(21) Appl. No.: 12/573,154

(22) Filed: Oct. 5, 2009

(65) Prior Publication Data

US 2011/0082899 A1   Apr. 7, 2011

(51) Int. Cl.
G06F 15/16 (2006.01)
H04L 12/24 (2006.01)
G06F 15/173 (2006.01)

(52) U.S. Cl.
CPC ........ H04L 41/5038 (2013.01); H04L 41/5083 (2013.01)

(58) Field of Classification Search
CPC .................. H04L 41/5038; H04L 41/5083
See application file for complete search history.

(56) References Cited

U.S. PATENT DOCUMENTS

| | | | |
|---|---|---|---|
| 6,775,804 B1* | 8/2004 | Dawson | 714/776 |
| 2004/0006653 A1* | 1/2004 | Kamen et al. | 709/330 |
| 2004/0064529 A1* | 4/2004 | Meredith et al. | 709/219 |
| 2006/0150026 A1 | 7/2006 | Kolawa et al. | |
| 2007/0255718 A1 | 11/2007 | Baikov et al. | |
| 2008/0034160 A1* | 2/2008 | Neiman et al. | 711/118 |
| 2008/0059558 A1* | 3/2008 | Singh et al. | 709/202 |
| 2008/0066189 A1 | 3/2008 | Liu et al. | |
| 2008/0126390 A1* | 5/2008 | Day et al. | 707/102 |
| 2010/0153163 A1* | 6/2010 | Peltz et al. | 705/9 |
| 2010/0162263 A1* | 6/2010 | Kamalahasan et al. | 719/313 |

FOREIGN PATENT DOCUMENTS

WO   2004021220 A1   3/2004

OTHER PUBLICATIONS

"Adventnet Inc", "Adventnet Qengine Datasheet", Copyright Date: 2006, pp. 1-3.
"Rogue Wave Software Inc", "A Guide to Creating C++ Service-Based and SOA Applications Whitepaper", Copyright Date: 2009, pp. 1-10.
"Earnest Cho, Sam Chung and Daniel Zimmerman", "Automatic Web Services Generation", 42nd Hawaii International Conference on System Sciences, 2009 (HICSS '09), Publication Date: Jan. 5-8, 2009, pp. 1-8.

(Continued)

*Primary Examiner* — Joseph Greene
(74) *Attorney, Agent, or Firm* — Narendra Reddy Thappeta

(57) ABSTRACT

An aspect of the present invention facilitates testing of client systems consuming contractual services on different server systems. In one embodiment, a contract (for which the client system is sought to be tested) is first inspected to determine the set of contractual services present in the contract and a minimal implementation for each of the determined set of contractual services is generated. The minimal implementations are designed to merely provide arbitrary outputs consistent with the contract. On receiving a request to invoke a desired one of the set of contractual services from the client system, a corresponding response is sent due to invocation of the (minimal) implementation generated for the desired contractual service, thereby facilitating testing of client system for a different server system.

19 Claims, 26 Drawing Sheets

(56) References Cited

OTHER PUBLICATIONS

"Yenan Qu, Evan F. Bollig and Gordon Erlebacher", "KWATT: A Toolkit for Automatic Web Service Generation", "http://www.springerlink.com/content/n317241521g78232/fulltext.pdf?page=1", Publication Date: Jun. 3, 2008, pp. 1-1.

"Miguel Angel Corella, Jose Maria Fuentes and Pablo Castells", "Semi-Automatic Web Service Generation and Classification", Proceedings of the ICWS 2005 Second International Workshop on Semantic and Dynamic Web Processes, Jul. 11, 2005, vol. 140, Paper 4, pp. 1-15.

"Vania Vidal, Fernando Lemos and Fabio Porto", "Towards Automatic Generation of AXML Web Services for Dynamic Data Integration", ACM International Conference Proceeding Series, vol. 353, Publication Date: Mar. 25, 2008, pp. 43-50.

"Xiaoying Bai, Wenli Dong, Wei-Tek Tsai and Yinong Chen", "WSDL-Based Automatic Test Case Generation for Web Services Testing", Proceedings of the 2005 IEEE International Workshop on Service-Oriented System Engineering (SOSE'05), Publication Date: Oct. 20-21, 2005, pp. 207-212.

* cited by examiner

```
401: <definitions xmlns="http://schemas.xmlsoap.org/wsdl/" xmlns:soap="http://schemas.xmlsoap.org/wsdl/soap/"
402:   xmlns:wsaw="http://www.w3.org/2006/05/addressing/wsdl" xmlns:xs="http://www.w3.org/2001/XMLSchema"
403:   xmlns:i0="http://xwsinterop/soapwsdl/parameters" xmlns:tns="http://tempuri.org/"
404:   name="OutRefParamsService" targetNamespace="http://tempuri.org/">
405: <types>
406:   <xs:schema targetNamespace="http://xwsinterop/soapwsdl/parameters/Imports" >
407:     <xs:element name="anyType" nillable="true" type="xs:anyType"/>
408:     <xs:element name="base64Binary" nillable="true" type="xs:base64Binary"/>
409:     <xs:element name="byte" nillable="true" type="xs:byte"/>
410:     <xs:element name="int" nillable="true" type="xs:int"/>
411:     <xs:element name="string" nillable="true" type="xs:string"/>
412:     ...
413:   </xs:schema>
414:   <xs:schema elementFormDefault="qualified" targetNamespace="http://xwsinterop/soapwsdl/parameters">
415:     <xs:complexType name="Employee">
416:       <xs:complexContent mixed="false"><xs:extension base="i0:Person">
417:         <xs:sequence>
418:           <xs:element minOccurs="0" name="HireDate" nillable="true" type="xs:dateTime"/>
419:           <xs:element minOccurs="0" name="ID" nillable="true" type="xs:float"/>
420:           <xs:element minOccurs="0" name="Manager" nillable="true" type="i0:Employee"/>
421:         </xs:sequence>
422:       </xs:extension></xs:complexContent>
423:     </xs:complexType>
424:     <xs:complexType name="Person">
425:       <xs:sequence>
426:         <xs:element minOccurs="0" name="Age" nillable="true" type="xs:int"/>
427:         <xs:element minOccurs="0" name="Name" nillable="true" type="xs:string"/>
428:       </xs:sequence>
429:     </xs:complexType>
430:     <xs:complexType name="MultipleParams">
```

*FIG. 4A*

```
431:     <xs:sequence>
432:         <xs:element minOccurs="0" name="ByteArray" nillable="true" type="xs:base64Binary"/>
433:         <xs:element minOccurs="0" name="Employee" nillable="true" type="i0:Employee"/>
434:         <xs:element minOccurs="0" name="Int" nillable="true" type="xs:int"/>
435:         <xs:element minOccurs="0" name="String" nillable="true" type="xs:string"/>
436:     </xs:sequence>
437:   </xs:complexType>
438:   <xs:element name="Employee" nillable="true" type="i0:Employee"/>
439:   <xs:element name="Person" nillable="true" type="i0:Person"/>
440:   <xs:element name="MultipleParams" nillable="true" type="i0:MultipleParams"/>
441: </xs:schema>
442: </types>
443: <message name="IOutRefParamsService_RetStringOut_InputMessage">
444:     <part name="inString" type="xsd:string"/>
445: </message>
446: <message name="IOutRefParamsService_RetStringOut_OutputMessage">
447:     <part name="RetStringOutResult" type="xsd:string"/>
448:     <part name="outString" type="xsd:string"/>
449: </message>
450: ...
451: <message name="IOutRefParamsService_RetEmployeeOut_InputMessage">
452:     <part name="inEmployee" type="i0:Employee"/>
453: </message>
454: <message name="IOutRefParamsService_RetEmployeeOut_OutputMessage">
455:     <part name="RetEmployeeOutResult" type="i0:Employee"/>
456:     <part name="outEmployee" type="i0:Employee"/>
457: </message>
458: <message name="IOutRefParamsService_RetMultipleParams_InputMessage">
459:     <part name="inString" type="xsd:string"/>
460:     <part name="refString" type="xsd:string"/>
```

```
461:    <part name="inInt" type="xsd:int"/>
462:    <part name="refInt" type="xsd:int"/>
463:    <part name="inByteArray" type="xsd:base64Binary"/>
464:    <part name="refByteArray" type="xsd:base64Binary"/>
465:    <part name="inEmployee" type="i0:Employee"/>
466:    <part name="refEmployee" type="i0:Employee"/>
467: </message>
468: <message name="IOutRefParamsService_RetMultipleParams_OutputMessage">
469:    <part name="RetMultipleParamsResult" type="i0:MultipleParams"/>
470:    <part name="outString" type="xsd:string"/>
471:    <part name="refString" type="xsd:string"/>
472:    ...
473:    <part name="refEmployee" type="i0:Employee"/>
474: </message>
475: <portType name="IOutRefParamsService">
476:    <operation name="RetStringOut" parameterOrder="inString outString">
477:        <input message="i0:IOutRefParamsService_RetStringOut_InputMessage"
478:            wsaw:Action="http://xwsinterop/soapwsdl/parameters/IOutRefParamsService/RetStringOut"/>
479:        <output message="i0:IOutRefParamsService_RetStringOut_OutputMessage"
480:            wsaw:Action="http://xwsinterop/soapwsdl/parameters/IOutRefParamsService/RetStringOutResponse"/>
481:    </operation>
482:    ...
483:    <operation name="RetEmployeeOut" parameterOrder="inEmployee outEmployee">
484:        <input message="i0:IOutRefParamsService_RetEmployeeOut_InputMessage"
485:            wsaw:Action="http://xwsinterop/soapwsdl/parameters/IOutRefParamsService/RetEmployeeOut"/>
486:        <output message="i0:IOutRefParamsService_RetEmployeeOut_OutputMessage"
487:            wsaw:Action="http://xwsinterop/soapwsdl/parameters/IOutRefParamsService/RetEmployeeOutResponse"/>
488:    </operation>
489:    ...
490: </portType>
```

```
491: <binding name="BasicHttpBinding_IOutRefParamsService" type="i0:IOutRefParamsService">
492:     <soap:binding style="rpc" transport="http://schemas.xmlsoap.org/soap/http"/>
493:     <operation name="RetStringOut">
494:         <soap:operation style="rpc" soapAction="http://xwsinterop/soapwsdl/parameters/IOutRefParamsService/RetStringOut"/>
495:         <input><soap:body use="literal" namespace="http://xwsinterop/soapwsdl/parameters"/></input>
496:         <output><soap:body use="literal" namespace="http://xwsinterop/soapwsdl/parameters"/></output>
497:     </operation>
498:     ...
499:     <operation name="RetEmployeeOut">
400A:         <soap:operation style="rpc" soapAction="http://xwsinterop/soapwsdl/parameters/IOutRefParamsService/RetEmployeeOut"/>
401A:         <input><soap:body use="literal" namespace="http://xwsinterop/soapwsdl/parameters"/></input>
402A:         <output><soap:body use="literal" namespace="http://xwsinterop/soapwsdl/parameters"/></output>
403A:     </operation>
404A:     ...
405A: </binding>
406A: <service name="OutRefParamsService">
407A:     <port name="BasicHttpBinding_IOutRefParamsService" binding="tns:BasicHttpBinding_IOutRefParamsService">
408A:         <soap:address location="http://wsip1.acme.com:8889/OutRefParamsService_RpcLit/OutRefParamsService_RpcLit"/>
409A:     </port>
410A: </service>
411A: </definitions>
```

```
501: package org.tempuri;
502: import javax.jws.*;
503: import javax.jws.soap.SOAPBinding;
504: import javax.xml.bind.annotation.XmlSeeAlso;
505: import javax.xml.ws.Holder;
506: import xwsinterop.soapwsdl.parameters.Employee;
507: import xwsinterop.soapwsdl.parameters.MultipleParams;
508:
509: @WebService(name = "IOutRefParamsService", targetNamespace = "http://xwsinterop/soapwsdl/parameters")
510: @SOAPBinding(style = SOAPBinding.Style.RPC)
511: @XmlSeeAlso({ com.microsoft.schemas._2003._10.serialization.arrays.ObjectFactory.class,
512: xwsinterop.soapwsdl.parameters.ObjectFactory.class,
com.microsoft.schemas._2003._10.serialization.ObjectFactory.class})
513: public interface IOutRefParamsService {
515: @WebMethod(operationName = "RetStringOut", action = "http://xwsinterop/.../IOutRefParamsService/RetStringOut")
516: @WebResult(name = "RetStringOutResult", partName = "RetStringOutResult")
517: public String retStringOut(
518: @WebParam(name = "inString", partName = "inString") String inString,
519: @WebParam(name = "outString", mode = WebParam.Mode.OUT, partName = "outString") Holder<String> outString);
520:
521: @WebMethod(operationName = "RetIntOut", action = "http://xwsinterop/.../IOutRefParamsService/RetIntOut")
522: @WebResult(name = "RetIntOutResult", partName = "RetIntOutResult")
523: public int retIntOut(
524: @WebParam(name = "inInt", partName = "inInt") int inInt,
```

```
525:     @WebParam(name = "outInt", mode = WebParam.Mode.OUT, partName = "outInt") Holder<Integer> outInt);
526:
527: @WebMethod(operationName = "RetByteArrayRef",
528:     action = "http://xwsinterop/soapwsdl/parameters/IOutRefParamsService/RetByteArrayRef")
529: @WebResult(name = "RetByteArrayRefResult", partName = "RetByteArrayRefResult")
530: public byte[] retByteArrayRef(
531:     @WebParam(name = "inByteArray", partName = "inByteArray") byte[] inByteArray,
532:     @WebParam(name = "refByteArray", mode = WebParam.Mode.INOUT, partName = "refByteArray")
533:     Holder<byte[]> refByteArray);
534: @WebMethod(operationName = "RetEmployeeOut", action = "http://xwsinterop/.../IOutRefParamsService/RetEmployeeOut")
535: @WebResult(name = "RetEmployeeOutResult", partName = "RetEmployeeOutResult")
536: public Employee retEmployeeOut(
537:     @WebParam(name = "inEmployee", partName = "inEmployee") Employee inEmployee,
538:     @WebParam(name = "outEmployee", mode = WebParam.Mode.OUT, partName = "outEmployee")
539:     Holder<Employee> outEmployee);
540:
```

*FIG. 5A*
*(Continued)*

```
541: @WebMethod(operationName = "RetMultipleParams",
542:    action = "http://xwsinterop/soapwsdl/parameters/IOutRefParamsService/RetMultipleParams")
543: @WebResult(name = "RetMultipleParamsResult", partName = "RetMultipleParamsResult")
544: public MultipleParams retMultipleParams(
545:    @WebParam(name = "inString", partName = "inString") String inString,
546:    @WebParam(name = "outString", mode = WebParam.Mode.OUT, partName = "outString") Holder<String> outString,
547:    @WebParam(name = "refString", mode = WebParam.Mode.INOUT, partName = "refString") Holder<String> refString,
548:    @WebParam(name = "inInt", partName = "inInt") int inInt,
549:    @WebParam(name = "outInt", mode = WebParam.Mode.OUT, partName = "outInt") Holder<Integer> outInt,
550:    @WebParam(name = "refInt", mode = WebParam.Mode.INOUT, partName = "refInt") Holder<Integer> refInt,
551:    @WebParam(name = "inByteArray", partName = "inByteArray") byte[] inByteArray,
552:    @WebParam(name = "outByteArray", mode = WebParam.Mode.OUT, partName = "outByteArray")
553:       Holder<byte[]> outByteArray,
554:    @WebParam(name = "refByteArray", mode = WebParam.Mode.INOUT, partName = "refByteArray")
555:       Holder<byte[]> refByteArray,
556:    @WebParam(name = "inEmployee", partName = "inEmployee") Employee inEmployee,
557:    @WebParam(name = "outEmployee", mode = WebParam.Mode.OUT, partName = "outEmployee")
558:       Holder<Employee> outEmployee,
559:    @WebParam(name = "refEmployee", mode = WebParam.Mode.INOUT, partName = "refEmployee")
560:       Holder<Employee> refEmployee);
561: }
```

FIG. 5B

```
601: <GenServiceImplTestInfo xmlns:wsip="http://xmlns.oracle.com/technology/wsip/10/2007"
wsip:type="GenServiceImplTestInfo"
602:    xmlns:xsi="http://www.w3.org/2001/XMLSchema-instance" xmlns:xsd="http://www.w3.org/2001/XMLSchema" >
602: <compiledSEIPath xsi:type="string">/scratch/velsubra/wsip/tsrc/_BGlgj9__mxszyjSkv04HkA9AOYp4_/classes</
compiledSEIPath>
603: <targetNamespace xsi:type="string">http://tempuri.org/</targetNamespace>
604: <toGenSEIDescription xsi:type="boolean">true</toGenSEIDescription>
605: <portTypeName xsi:type="string">IOutRefParamsService</portTypeName>
606: <portDetails wsip:type="PortDetails[]" >
607:   <PortDetails wsip:type="PortDetails" >
608:     <serviceName xsi:type="string">OutRefParamsService</serviceName>
609:     <targetNamespace xsi:type="string">http://tempuri.org/</targetNamespace>
610:     <portName xsi:type="string">BasicHttpBinding_IOutRefParamsService</portName>
611:     <messageBindingName xsi:type="string">http://schemas.xmlsoap.org/wsdl/soap/http</
messageBindingName>
612:     <portTypeQName xsi:type="string">IOutRefParamsService</portTypeQName>
613:     <bindingQName xsi:type="string">{http://tempuri.org/}BasicHttpBinding_IOutRefParamsService</
bindingQName>
614:     <bindingOpStyleUse xsi:nill="true"></bindingOpStyleUse>
615:   </portDetails>
616: </portDetails>
617: <typeMaxDepth xsi:type="int">5</typeMaxDepth>
618: <qos wsip:type="NormalizedPolicyStore" >
619:   <supportedPolicies wsip:type="NormalizedPolicy[]" >
620:     <NormalizedPolicy wsip:type="NormalizedPolicy" >
621:       <policyRefId xsi:type="string">WSA</policyRefId>
622:       <properties wsip:type="NameValuePair[]" >
623:         <NameValuePair wsip:type="NameValuePair" >
624:           <name xsi:type="string">POLICY_ANNOTATION</name>
625:           <value xsi:type="string">javax.xml.ws.soap.Addressing</value>
```

*FIG. 6A*

```
626:       </NameValuePair>
627:     </properties>
628:     <policyName xsi:type="string">WS-Addressing</policyName>
629:     <customPolicy xsi:type="boolean">false</customPolicy>
630:     <supportedAtBuildClient xsi:type="boolean">true</supportedAtBuildClient>
631:     <supportedAtBuildService xsi:type="boolean">true</supportedAtBuildService>
632:     <requiresOfflineServerConfiguration xsi:type="boolean">false</requiresOfflineServerConfiguration>
633:     <policyData xsi:nill="true"></policyData>
634:     <disabled xsi:type="boolean">false</disabled>
635:   </NormalizedPolicy>
636:   <NormalizedPolicy wsip:type="NormalizedPolicy" >
637:     <policyRefId xsi:type="string">WSIP_SERVICE_BOTTOM_UP_JAX_WS</policyRefId>
638:     <properties wsip:type="NameValuePair[]" >
639:       <NameValuePair wsip:type="NameValuePair" >
640:         <name xsi:type="string">BINDING_TYPES</name>
641:         <value xsi:type="string">SOAP11_SOAP12</value>
642:       </NameValuePair>
643:       <NameValuePair wsip:type="NameValuePair" >
644:         <name xsi:type="string">STYLE_USE</name>
645:         <value xsi:type="string">DOC/LIT-WRAPPED</value>
646:       </NameValuePair>
647:       <NameValuePair wsip:type="NameValuePair" >
648:         <name xsi:type="string">ONEWAY_PREFERENCE</name>
649:         <value xsi:type="string">NO_PREFERENCE</value>
650:       </NameValuePair>
```

FIG. 6A
(Continued)

```
651: </properties>
652: <policyName xsi:type="string">Build Service Bottom Up</policyName>
653: <customPolicy xsi:type="boolean">false</customPolicy>
654: <!-- Other properties similar to those shown above -->
655: </NormalizedPolicy>
656: <!-- Other policies similar to those shown above -->
657: </supportedPolicies>
658: </qos>
659: <packageName xsi:type="string">test.sei.generated</packageName>
660: <testCaseName xsi:type="string">IOutRefParamsService</testCaseName>
661: <testName xsi:type="string">IOutRefParamsService</testName>
662: <platformId xsi:type="string">WLS1031_JAXWS</platformId>
663: <wsdlUrl xsi:type="string">http://ws.acme.com/OutRefParamsService_RpcLit/OutRefParamsService_RpcLit?WSDL</wsdlUrl>
664: <serviceStackId xsi:type="string">OC4J10131</serviceStackId>
665: <description xsi:type="string">No test description.</description>
666: <useHttpProxy xsi:type="boolean">false</useHttpProxy>
667: <asyncService xsi:type="boolean">false</asyncService>
668: </GenServiceImplTestInfo>
```

```
801: // WS-IP CodeGen Built On:Mon Apr 20 11:05:26 IST 2009, Code Generated for Stack: WLS1031_JAXWS
802: // SEI:org.tempuri.IOutRefParamsService
803: package test;
804: import test.GeneratedImpl;
805: import javax.jws.*;
806: import javax.xml.ws.Holder;
807: import xwsinterop.soapwsdl.parameters.Employee;
808: import xwsinterop.soapwsdl.parameters.MultipleParams;
809:
810: @WebService(endpointInterface="", wsdlLocation="", name="", serviceName="OutRefParamsService",
811:             portName="BasicHttpBinding_IOutRefParamsService", targetNamespace="http://xwsinterop/
     soapwsdl/parameters")
812: @javax.xml.bind.annotation.XmlSeeAlso(value={com.microsoft.schemas._2003._10.serialization.arrays.Object
     Factory.class,...})
813: @soap.SOAPBinding( style=soap.SOAPBinding.Style.DOCUMENT, use=soap.SOAPBinding.Use.LITERAL,
814:                    parameterStyle=soap.SOAPBinding.ParameterStyle.WRAPPED)
815: @BindingType(soap.SOAPBinding.SOAP11HTTP_BINDING)
816: @soap.Addressing
817: @weblogic.jws.Policies({ @weblogic.jws.Policy(uri="policy:Wssp1.2-2007-SignBody.xml"),
818: @weblogic.jws.Policy(uri="policy:Wssp1.2-2007-EncryptBody.xml") })
819: public class OutRefParamsService_BasicHttpBinding_IOutRefParamsService_ImplWrapper
820: {
821:     private GeneratedImpl _impl = null;
822:     public OutRefParamsService_BasicHttpBinding_IOutRefParamsService_ImplWrapper() {
823:         _impl = new GeneratedImpl();
824:     }
825:
826:     @WebMethod(operationName="RetStringOut", exclude=false, action="http://.../IOutRefParamsService/
     RetStringOut")
827:     @WebResult(partName="RetStringOutResult", name="RetStringOutResult", targetNamespace="",
     header=false)
```

FIG. 8A (Continued)

```
828:    public String retStringOut(
829:        @WebParam(partName="inString", name="inString", mode=WebParam.Mode.IN, targetNamespace="",
header=false)
830:        String arg0,
831:        @WebParam(partName="outString", name="outString", mode=WebParam.Mode.OUT,
targetNamespace="", header=false)
832:        Holder<String> arg1) {
833:            String _ret = _impl.retStringOut(arg0,arg1);
834:            return _ret;
835:    }
836:
837:    // ...Implementation of webmethod retIntOut similar to retStringOut
838:    @WebMethod(operationName="RetByteArrayRef", exclude=false, action="http://.../IOutRefParamsService/
RetByteArrayRef")
839:    @WebResult(partName="RetByteArrayRefResult", name="RetByteArrayRefResult", targetNamespace="",
header=false)
840:    public byte[] retByteArrayRef(
841:        @WebParam(partName="inByteArray", name="inByteArray", mode=WebParam.Mode.IN,
targetNamespace="", header=false)
842:        byte[] arg0,
843:        @WebParam(partName="refByteArray", name="refByteArray", mode=WebParam.Mode.INOUT, ....)
844:        Holder<byte[]> arg1) {
845:            byte[] _ret = _impl.retByteArrayRef(arg0,arg1);
846:            return _ret;
847:    }
848:
849:    @WebMethod(operationName="RetEmployeeOut", exclude=false, action="http://.../IOutRefParamsService/
RetEmployeeOut")
850:    @WebResult(partName="RetEmployeeOutResult", name="RetEmployeeOutResult", targetNamespace="",
header=false)
```

```
851:    public Employee retEmployeeOut(
852:        @WebParam(partName="inEmployee", name="inEmployee", mode=WebParam.Mode.IN,
targetNamespace="", header=false) 853:         Employee arg0,
854:        @WebParam(partName="outEmployee", name="outEmployee", mode=WebParam.Mode.OUT, ....,
header=false)
855:        Holder<Employee> arg1)   {
856:        Employee _ret =  _impl.retEmployeeOut(arg0,arg1);
857:        return _ret;
858:    }
859:
860:    @WebMethod(operationName="RetMultipleParams", exclude=false,
861:        action="http://xwsinterop/soapwsdl/parameters/IOutRefParamsService/RetMultipleParams")
862:    @WebResult(partName="RetMultipleParamsResult", name="RetMultipleParamsResult",
targetNamespace="", header=false)
863:    public MultipleParams retMultipleParams(
864:        @WebParam(partName="inString", name="inString", mode=WebParam.Mode.IN, targetNamespace="",
header=false)
865:        String arg0,
866:        @WebParam(partName="outString", name="outString", mode=WebParam.Mode.OUT,
targetNamespace="", header=false)
867:        Holder<String> arg1,
868:        // .... other parameters
869:        @WebParam(partName="refEmployee", name="refEmployee", mode=WebParam.Mode.INOUT, ....,
header=false)
870:        Holder<Employee> arg11)   {
871:        MultipleParams _ret =
_impl.retMultipleParams(arg0,arg1,arg2,arg3,arg4,arg5,arg6,arg7,arg8,arg9,arg10,arg11);
872:        return _ret;
873:    }
874: }
```

FIG. 8B

```
901: // WS-IP CodeGen Built On:Mon Apr 20 11:05:26 IST 2009
902: // Code Generated for the Stack: Oracle WebLogic,10.3.1,JAX-WS (JAVA SE) ->(WLS1031_JAXWS)
903: // SEI:org.tempuri.IOutRefParamsService
904: package test;
905: import oracle.wsip.util.bean.*;
906: import javax.xml.datatype.*;
907: import xwsinterop.soapwsdl.parameters.*;
908: import *;
909: import javax.xml.ws.Holder;
910:
911: public class GeneratedImpl
912: {
913:     public GeneratedImpl() {
914:     }
915:
916:     public String retStringOut( String arg0, Holder<String> arg1)   {
917:         arg1.value = "PCl817klbX";
918:         String ret = "2";
919:         return ret;
920:     }
921:
922:     public int retIntOut( int arg0, Holder<Integer> arg1)   {
923:         arg1.value = new Integer("0");
924:         int ret = (int)4.0;
925:         return ret;
926:     }
927:
928:     public byte[] retByteArrayRef( byte[] arg0, Holder<byte[]> arg1)   {
929:         arg1.value = new byte[1];
930:         arg1.value[0] = (byte)46;
```

```
931:        byte[] ret = new byte[1];
932:        ret[0] = (byte)69.0;
933:        return ret;
934:    }
935:    public Employee retEmployeeOut( Employee arg0, Holder<Employee> arg1)   {
936:        arg1.value = new Employee();
937:        arg1.value.setHireDate(JAXBElement.newInstance(XMLGregorianCalendar.class));
938:        arg1.value.setID(JAXBElement.newInstance(Float.class));
939:        arg1.value.setManager(JAXBElement.newInstance(Employee.class));
940:        arg1.value.setAge(JAXBElement.newInstance(Integer.class));
941:        arg1.value.setName(JAXBElement.newInstance(String.class));
942:
943:        Employee ret = new Employee();
944:        ret.setHireDate(JAXBElement.newInstance(XMLGregorianCalendar.class));
945:        ((JAXBElement<XMLGregorianCalendar>)ret.getHireDate()).setName(new QName());
946:
            ((QName)((JAXBElement<XMLGregorianCalendar>)ret.getHireDate()).getName()).setLocalPart("HireDate");
947:
            ((QName)((JAXBElement<XMLGregorianCalendar>)ret.getHireDate()).getName()).setNamespaceURI("http://.../parameters");
948:        ((QName)((JAXBElement<XMLGregorianCalendar>)ret.getHireDate()).getName()).setPrefix("wsip");
949:        ((JAXBElement<XMLGregorianCalendar>)ret.getHireDate()).setValue(
                                                           GeneralConfig.getXMLCalendarInstanceFor("12/3/2009"));
950:
951:        ((JAXBElement<XMLGregorianCalendar>)ret.getHireDate()).setNil(false);
952:
953:        ret.setID(JAXBElement.newInstance(Float.class));
954:        ((JAXBElement<Float>)ret.getID()).setName(new QName());
955:        ((QName)((JAXBElement<Float>)ret.getID()).getName()).setLocalPart("ID");
956:        ((QName)((JAXBElement<Float>)ret.getID()).getName()).setNamespaceURI("http://xwsinterop/soapwsdl/parameters");
957:        ((QName)((JAXBElement<Float>)ret.getID()).getName()).setPrefix("wsip");
958:        ((JAXBElement<Float>)ret.getID()).setValue(new Float("14"));
959:        ((JAXBElement<Float>)ret.getID()).setNil(false);
```

```
960:    ret.setManager(JAXBElement.newInstance(Employee.class));
961:    ((JAXBElement<Employee>)ret.getManager()).setName(new QName());
962:    ((QName)((JAXBElement<Employee>)ret.getManager()).getName()).setLocalPart("Manager");
963:    ((QName)((JAXBElement<Employee>)ret.getManager()).getName()).setNamespaceURI("http://.../
parameters");
964:    ((QName)((JAXBElement<Employee>)ret.getManager()).getName()).setPrefix("wsip");
965:    ((JAXBElement<Employee>)ret.getManager()).setValue(new Employee());
966:    ((JAXBElement<Employee>)ret.getManager()).getValue().setHireDate(
967:        JAXBElement.newInstance(XMLGregorianCalendar.class));
968:    ((JAXBElement<XMLGregorianCalendar>)
969:        ((JAXBElement<Employee>)ret.getManager()).getValue().getHireDate()).setName(new
QName());
970:    // ... configure properties of HireDate of Manager
971:    ((JAXBElement<XMLGregorianCalendar>)
972:    ((JAXBElement<Employee>)ret.getManager()).getValue().getHireDate()).
973:        setValue(GeneralConfig.getXMLCalendarInstanceFor("12/3/2007"));
974:    // ... configure properties of ID of Manager
975:    ((JAXBElement<Employee>)ret.getManager()).getValue().setID(JAXBElement.newInstance(Float.class));
976:    ((JAXBElement<Float>)((JAXBElement<Employee>)ret.getManager()).getValue().getID()).setValue(new
Float("1"));
977:    // ... configure propoerties of the manager of the manager
978:
979:    ret.setAge(JAXBElement.newInstance(Integer.class));
980:    ((JAXBElement<Integer>)ret.getAge()).setName(new QName());
981:    ((QName)((JAXBElement<Integer>)ret.getAge()).getName()).setLocalPart("Age");
982:    ((QName)((JAXBElement<Integer>)ret.getAge()).getName()).setNamespaceURI("http://xwsinterop/soapwsdl/
parameters");
983:    ((QName)((JAXBElement<Integer>)ret.getAge()).getName()).setPrefix("wsip");
984:    ((JAXBElement<Integer>)ret.getAge()).setValue(new Integer("25"));
985:    ((JAXBElement<Integer>)ret.getAge()).setNil(false);
```

FIG. 9B

```
988:     ret.setName(JAXBElement.newInstance(String.class));
989:     ((JAXBElement<String>)ret.getName()).setName(new QName());
990:     ((QName)((JAXBElement<String>)ret.getName()).getName()).setLocalPart("Name");
991:     ((QName)((JAXBElement<String>)ret.getName()).getName()).setNamespaceURI("http://xwsinterop/soapwsdl/parameters");
992:     ((QName)((JAXBElement<String>)ret.getName()).getName()).setPrefix("wsip");
993:     ((JAXBElement<String>)ret.getName()).setValue("2");
994:     ((JAXBElement<String>)ret.getName()).setNil(false);
995:     return ret;
996:   }
997:
998:   public MultipleParams retMultipleParams( String arg0, Holder<Employee> arg1, Holder<String> arg2, int arg3,
999:           Holder<Integer> arg4, Holder<Employee> arg5, byte[] arg6, Holder<byte[]> arg7, Holder<byte[]>
arg8,
900A:           Employee arg9, Holder<Employee> arg10, Holder<Employee> arg11 )  {
901A:     arg1.value = "DVH426jgmS";
902A:     arg2.value = "URO219dgoO";
903A:     arg4.value = new Integer("0");
904A:     arg5.value = new Integer("0");
905A:     arg7.value = new byte[0];
906A:     arg8.value = new byte[0];
907A:     arg10.value = new Employee();
908A:     // ...set arg10.value similar to creating a new Employee shown above
909A:     arg11.value = new Employee();
910A:     // ...set arg11.value similar to creating a new Employee shown above
```

FIG. 9C

```
911A:    MultipleParams ret = new MultipleParams();
912A:    ret.setByteArray(JAXBElement.newInstance(byte[].class));
913A:    ((JAXBElement<byte[]>)ret.getByteArray()).setName(new QName();
914A:    ((QName)((JAXBElement<byte[]>)ret.getByteArray()).getName()).setLocalPart("ByteArray");
915A:    ((QName)((JAXBElement<byte[]>)ret.getByteArray()).getName()).setNamespaceURI("http://.../parameters");
916A:    ((QName)((JAXBElement<byte[]>)ret.getByteArray()).getName()).setPrefix("wsip");
917A:    ((JAXBElement<byte[]>)ret.getByteArray()).setValue( new byte[1]);
918A:    ((JAXBElement<byte[]>)ret.getByteArray()).getValue()[0] = (byte)10.0;
919A:    ((JAXBElement<byte[]>)ret.getByteArray()).setNil(false);
920A:
921A:
922A:    ret.setEmployee(JAXBElement.newInstance(Employee.class));
923A:    // ...set Employee value similat to creating a new Employee shown above
924A:
925A:    ret.setInt(JAXBElement.newInstance(Integer.class));
926A:    ((JAXBElement<Integer>)ret.getInt()).setName(new QName();
927A:    ((QName)((JAXBElement<Integer>)ret.getInt()).getName()).setLocalPart("Int");
928A:    ((QName)((JAXBElement<Integer>)ret.getInt()).getName()).setNamespaceURI("http://xwsinterop/soapwsdl/parameters");
929A:    ((QName)((JAXBElement<Integer>)ret.getInt()).getName()).setPrefix("wsip"));
930A:    ((JAXBElement<Integer>)ret.getInt()).setValue(new Integer("9"));
931A:    ((JAXBElement<Integer>)ret.getInt()).setNil(false);
932A
933A:    ret.setString(JAXBElement.newInstance(String.class));
934A:    //..... configure properties of the String similar to Int shown above
936A:    ((JAXBElement<String>)ret.getString()).setValue("50");
937A:
938A:    // set other values of ret
939A:    return ret;
940A:  }
941A: }
```

```
1001: <process name="BasicHttpBinding_IOutRefParamsService" xmlns="http://schemas.xmlsoap.org/ws/2003/03/business-process/"
1002:    targetNamespace="http://xmlns.oracle.com/BPELWithMultiOp/BPELWithMultiOpProj/BPELProcess"
1003:    xmlns:ns1="http://tempuri.org/" xmlns:wsip1="http://xwsinterop/soapwsdl/parameters">
1004: <partnerLinks>
1005:    <partnerLink name="client" partnerLinkType="ns1:BPELProcess" myRole="IOutRefParamsService"/>
1006:    <partnerLink name="Reference" partnerRole="IOutRefParamsService" partnerLinkType="ns1:Reference"/>
1007: </partnerLinks>
1008: <variables>
1009: <variable name="OnMessage_InputVariable_0" messageType="wsip1:IOutRefParamsService_RetStringOut_InputMessage"/>
1010: <variable name="InvokeResult_OutputVariable_0" messageType="wsip1:IOutRefParamsService_RetStringOut_OutputMessage" />
1011: <variable name="OnMessage_InputVariable_2" messageType="wsip1:IOutRefParamsService_RetIntOut_InputMessage"/>
1012: <variable name="InvokeResult_OutputVariable_2" messageType="wsip1:IOutRefParamsService_RetIntOut_OutputMessage"/>
1013: <variable name="OnMessage_InputVariable_5" messageType="wsip1:IOutRefParamsService_RetByteArrayRef_InputMessage"/>
1014: <variable name="InvokeResult_OutputVariable_5" messageType="wsip1:IOutRefParamsService_RetByteArrayRef_OutputMessage" />
1015:        messageType="wsip1:IOutRefParamsService_RetByteArrayRef_OutputMessage"/>
1016: <variable name="OnMessage_InputVariable_10" messageType="wsip1:IOutRefParamsService_RetEmployeeOut_InputMessage"/>
1017: <variable name="InvokeResult_OutputVariable_10"
1018:        messageType="wsip1:IOutRefParamsService_RetEmployeeOut_OutputMessage"/>
1019: <variable name="OnMessage_InputVariable_14" messageType="wsip1:IOutRefParamsService_RetMultipleParams_InputMessage"/>
1020:        messageType="wsip1:IOutRefParamsService_RetMultipleParams_InputMessage"/>
```

```
1021: <variable name="InvokeResult_OutputVariable_14"
1022:        messageType="wsip1:IOutRefParamsService_RetMultipleParams_OutputMessage"/>
1023: </variables>
1024: <sequence name="main">
1025: <pick name="Pick_1" createInstance="yes">
1026:   <onMessage partnerLink="client" portType="wsip1:IOutRefParamsService"
1027:        operation="RetStringOut" variable="OnMessage_InputVariable_0">
1028:     <sequence name="sequence_0">
1029:       <invoke name="Invoke_0" partnerLink="Reference" portType="wsip1:IOutRefParamsService"
operation="RetStringOut"
1030:            inputVariable="OnMessage_InputVariable_0" outputVariable="InvokeResult_OutputVariable_0"/>
1031:       <reply name="Reply_0" partnerLink="client" portType="wsip1:IOutRefParamsService"
1032:            operation="RetStringOut" variable="InvokeResult_OutputVariable_0"/>
1033:     </sequence>
1034:   </onMessage>
1036:   <onMessage partnerLink="client" portType="wsip1:IOutRefParamsService"
1037:        operation="RetIntOut" variable="OnMessage_InputVariable_2">
1038:     <sequence name="sequence_2">
1039:       <invoke name="Invoke_2" partnerLink="Reference" portType="wsip1:IOutRefParamsService" operation="RetIntOut"
1040:            inputVariable="OnMessage_InputVariable_2" outputVariable="InvokeResult_OutputVariable_2"/>
1041:       <reply name="Reply_2" partnerLink="client" portType="wsip1:IOutRefParamsService"
1042:            operation="RetIntOut" variable="InvokeResult_OutputVariable_2"/>
1043:     </sequence>
1044:   </onMessage>
1045:   <onMessage partnerLink="client" portType="wsip1:IOutRefParamsService"
```

FIG. 10A
(Continued)

```
1046:            operation="RetByteArrayRef" variable="OnMessage_InputVariable_5"/>
1047:          <sequence name="sequence_5">
1048:            <invoke name="Invoke_5" partnerLink="Reference" portType="wsip1:IOutRefParamsService"
operation="RetByteArrayRef"
1049:              inputVariable="OnMessage_InputVariable_5" outputVariable="InvokeResult_OutputVariable_5"/>
1050:            <reply name="Reply_5" partnerLink="client" portType="wsip1:IOutRefParamsService"
1051:              operation="RetByteArrayRef" variable="InvokeResult_OutputVariable_5"/>
1052:          </sequence>
1053:        </onMessage>
1054:        <onMessage partnerLink="client" portType="wsip1:IOutRefParamsService"
1055:          operation="RetEmployeeOut" variable="OnMessage_InputVariable_10">
1056:          <sequence name="sequence_10">
1057:            <invoke name="Invoke_10" partnerLink="Reference" portType="wsip1:IOutRefParamsService"
operation="RetEmployeeOut"
1058:              inputVariable="OnMessage_InputVariable_10" outputVariable="InvokeResult_OutputVariable_10"/>
1059:            <reply name="Reply_10" partnerLink="client" portType="wsip1:IOutRefParamsService"
1060:              operation="RetEmployeeOut" variable="InvokeResult_OutputVariable_10"/>
1061:          </sequence>
1062:        </onMessage>
1063:        <!-- ....other services -->
1064:      </pick>
1065:    </sequence>
1066: </process>
```

*FIG. 10B*

TESTING OF CLIENT SYSTEMS CONSUMING CONTRACTUAL SERVICES ON DIFFERENT SERVER SYSTEMS

BACKGROUND OF THE INVENTION

1. Technical Field

The present disclosure relates to testing interaction between client and server systems, and more specifically to testing of client systems consuming contractual services (such as web services and Service Oriented Architecture (SOA) services) on different server systems.

2. Related Art

Server systems commonly provide services that can be invoked by other systems typically via a network. The program logic underlying the services is usually implemented by enterprise applications executing in the server system. Thus, in a common scenario, a client system invokes (and thus consumes) one or more services (to perform a desired task on or using the server system) and receives corresponding responses.

Services are often defined by a corresponding contract, which specifies input/output parameters, the type of the parameters, the format of invoking the service (sending the request), the format of the response, etc. The contract is specified in a structured format such as XML, which makes the content machine-understandable. Thus, client systems can request such contracts and then invoke the services according to the received specification. The services provided according to such contracts are referred to as contractual services.

Web services and Service Oriented Architecture (SOA) services are common examples of contractual services accessible on server systems. As is well known, SOA services are defined at a higher granularity (e.g., purchase of a book), whereas web services are defined at lower granularity (e.g., check book availability, credit card transaction for a purchase, reserve a book for shipping, etc.). SOA services may consume web services in a backend to provide such higher granularity. As is further well known, the contracts for web services and SOA services are often specified according to Web Service Definition Language (WSDL).

There is often a need to test client systems consuming contractual services on different server systems, for example, having different operating environments (e.g., web service stacks, process servers, etc.) for the contractual services. Various aspects of the present invention provide for such testing, as described below in further detail.

BRIEF DESCRIPTION OF THE DRAWINGS

Example embodiments of the present invention will be described with reference to the accompanying drawings briefly described below.

FIGS. 4A-4C together depict samples portions of an WSDL file (contract) specifying contractual services not yet available in a server system in one embodiment.

FIGS. 5A-5B together depicts sample portions of a service endpoint interface (SEI) created for a WSDL file (shown in FIGS. 4A-4C) in one embodiment.

FIGS. 6A-6B depicts portions of a configuration file used in generating implementations of contractual services in one embodiment.

FIGS. 8A-8B together depicts a wrapper class generated for sending responses to requests for invocation of contractual services in one embodiment.

FIGS. 9A-9D together depicts an implementation class generated for contractual services in one embodiment.

FIGS. 10A-10B together depicts portions of a SOA services implementation generated for a contractual service (as specified by the WSDL shown in FIGS. 4A-4C) not yet implemented in a server system in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention facilitates testing of a client system consuming contractual services on different server systems. In one embodiment, a contract (for which the client system is sought to be tested) is first inspected to determine the set of contractual services present in the contract and a minimal implementation for each of the determined set of contractual services is generated, with the minimal implementation being designed to merely provide arbitrary outputs consistent with the contract.

The term arbitrary implies that the relationship between the values of the outputs thus provided would not have correlation with the actual values (for the same set of inputs) that would be generated once the production implementations of the contractual services are implemented (or made available) on the server system. For example, random values may be generated for the outputs or the one or more of the input values may be copied and provided as output values. Thus, on receiving a request to invoke a desired one of the set of contractual services from the client system, a corresponding response is sent due to invocation of the (minimal) implementation generated for the desired contractual service.

By using such an approach, different server systems can be quickly made ready for testing client systems with respect to at least some aspects of a contract.

In one embodiment, the contractual services sought to be tested are web services, with the minimal implementations being generated according to a programming language supported by a framework (executing the contractual service implementations). In another embodiment, the contractual services are SOA (service oriented architecture) services, with the minimal implementations being generated according to Business Process Execution Language (BPEL) supported by the framework.

According to another aspect of the present invention, when a contractual service is a SOA service that consumes another set of web services, the implementation for the contractual/

SOA service and each of another set of web services is also generated. Accordingly, inter-operability testing of SOA services consuming web services is facilitated.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Production Environment

Figure 1:
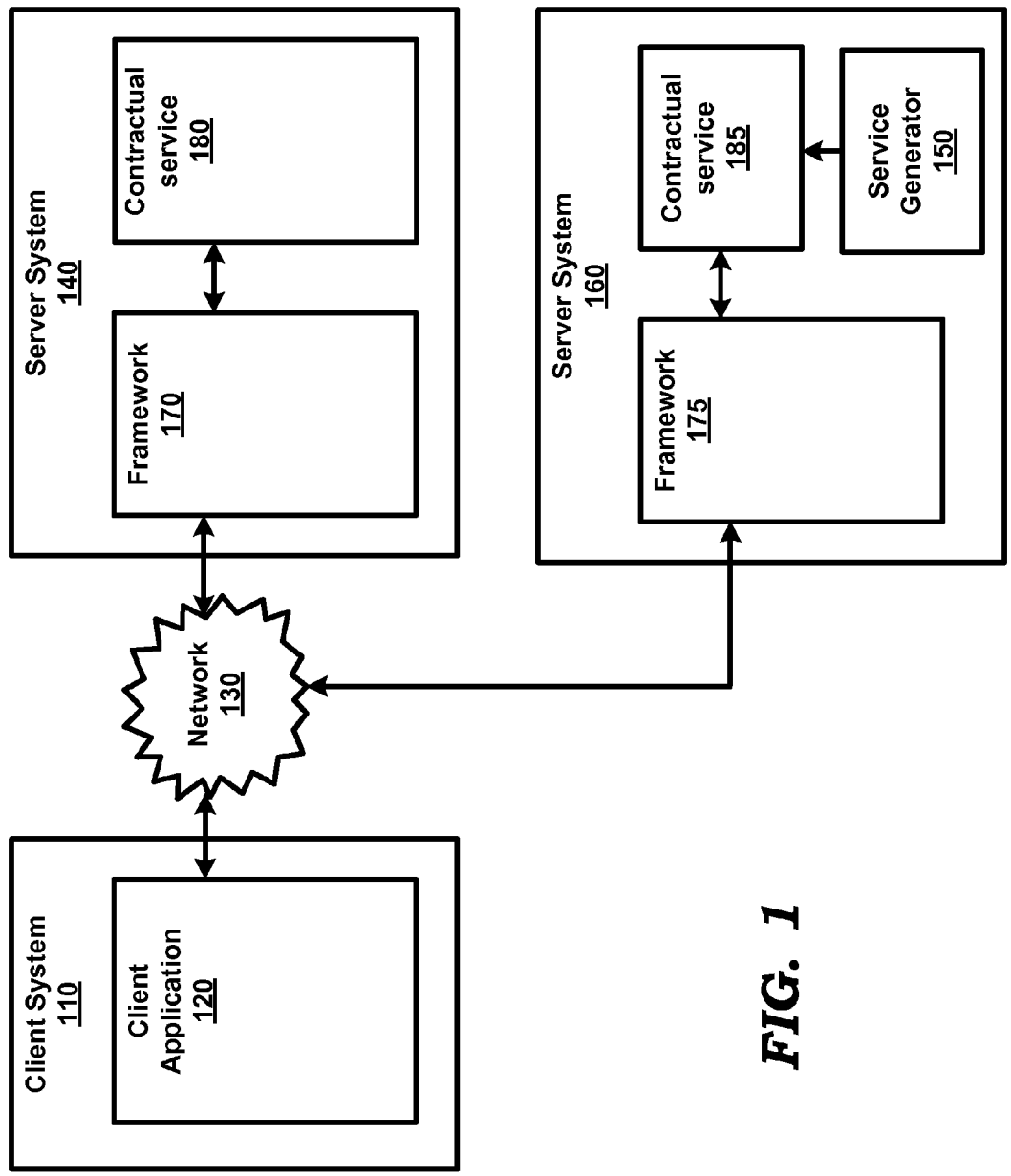
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing client system 110 (which in turn, is shown containing client application 120), network 130, and server systems 140 and 160. Server system 140 is shown containing framework 170 and contractual service 180, while server system 160 is shown containing service generator 150, framework 175 and contractual service 185.

Merely for illustration, only representative number/type of systems is shown in FIG. 1. Many environments often contain many more systems, both in number and type and hosting different/multiple contractual services, depending on the purpose for which the environment is designed. Each system/device of FIG. 1 is described below in further detail.

Network 130 provides connectivity between client system 110 and server systems 140 and 160. Network 130 may be implemented using protocols such as Transmission Control Protocol (TCP) and/or Internet Protocol (IP), well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

Server system 140 represents a production server such as a web/application server executing one or more enterprise applications. The enterprise applications implement the program logic underlying the various contractual services (such as 180) provided by server system 140. Server system 140 may also execute other software programs such as operating systems, device drivers, virtual machines, etc., which provide a (common) run time environment for execution of the enterprise applications.

Contractual service 180 represents an application component or functionality (part of enterprise applications after deployment in production mode) whose interfaces and bindings (for example, input/output parameters, the type of the parameters, the format of sending the request for invoking the service, the format of the response, etc.) are specified as a contract. Contractual service 180 is typically identified by and accessed using a unique Universal Resource Identifier (URI). Contractual service 180 may represent a web service or a SOA service, with the contract specified according to WSDL. Contractual service 180 contains the program logic to generate actual values (corresponding to those in production mode) according to the business logic/specification for which server system 140 is designed.

Framework 170 facilitates contractual services (such as 180) to be hosted on server system 140. In particular, framework 170 enables different contractual services (such as 180) to be defined and implemented, as well as to be located and invoked by client applications (such as 120) executing in client systems (such as 110) using standard protocols such as HTTP (Hyper Text Transfer Protocol) and SOAP. Thus, framework 170 forwards requests received from client systems for invocation of contractual services to the corresponding implementations (based on a URI), and then sends the corresponding responses (containing the results of the requested invocations) to the requesting client systems. Framework 170 may also provide the contract (e.g. a WSDL file) corresponding to contractual services executing in server system 140 to client applications.

In an embodiment, framework 170 verifies whether the values of the inputs received for contractual service 180, are according to the respective input formats specified in the contract, before forwarding the corresponding request to contractual service 180.

Framework 170 may represent a web service stack such as Oracle Application Server (OAS) web services stack available from Oracle Corporation, .NET web services stack available from Microsoft Corporation, etc., which facilitates hosting of web services on server system 140. Alternatively, framework 170 may represent a SOA process server such as Oracle BPEL Process Manager available from Oracle Corporation, WebSphere Process Server available from IBM Corporation, etc. which facilitates hosting of SOA services on server system 140. Framework 170 may also represent a program such as Oracle SOA suite 11g available from Oracle Corporation which facilitates both web services and SOA services to be simultaneously hosted on server system 140.

Client system 110 represents a system such as a personal computer, workstation, mobile station, etc., used by users to generate requests for invocation of contractual services (such as 180) executing in server system 140. The requests may be generated using appropriate user interfaces provided by applications, such as client application 120, executing in client system 110. In general, client application 120 sends requests for invocation of specific contractual services (such as 180, based on URI) to perform desired tasks to server system 140 (in particular to framework 170) and receives corresponding responses containing the results of invocation of the requested services (which may then be displayed to the users).

Server system 160 operates similar to server system 140, except that server system 160 represents a testing server according to several aspects of the present invention described below. Framework 175 though operating similar to framework 170, represents a different framework (web service stack or process server) that facilitates contractual services to be hosted on server system 160.

It may be desirable that the contractual services (such as 180) be provisioned on server system 160 (in particular, to work in the context of framework 175) and the testing of client application 120 consuming the contractual services on server system 160 (for the same contract as that of contractual services available on server system 140) be performed.

Service generator 150, provided according to several aspects of the present invention, generates a minimal implementation 185 of the contractual service 180, thereby facilitating (interoperability) testing of client systems/applications consuming contractual services on different server systems. The manner in which service generator 150 generates the contractual service 185, and thereafter facilitates testing, is described below with examples.

3. Testing of Client Systems Consuming Contractual Services

Figure 2:
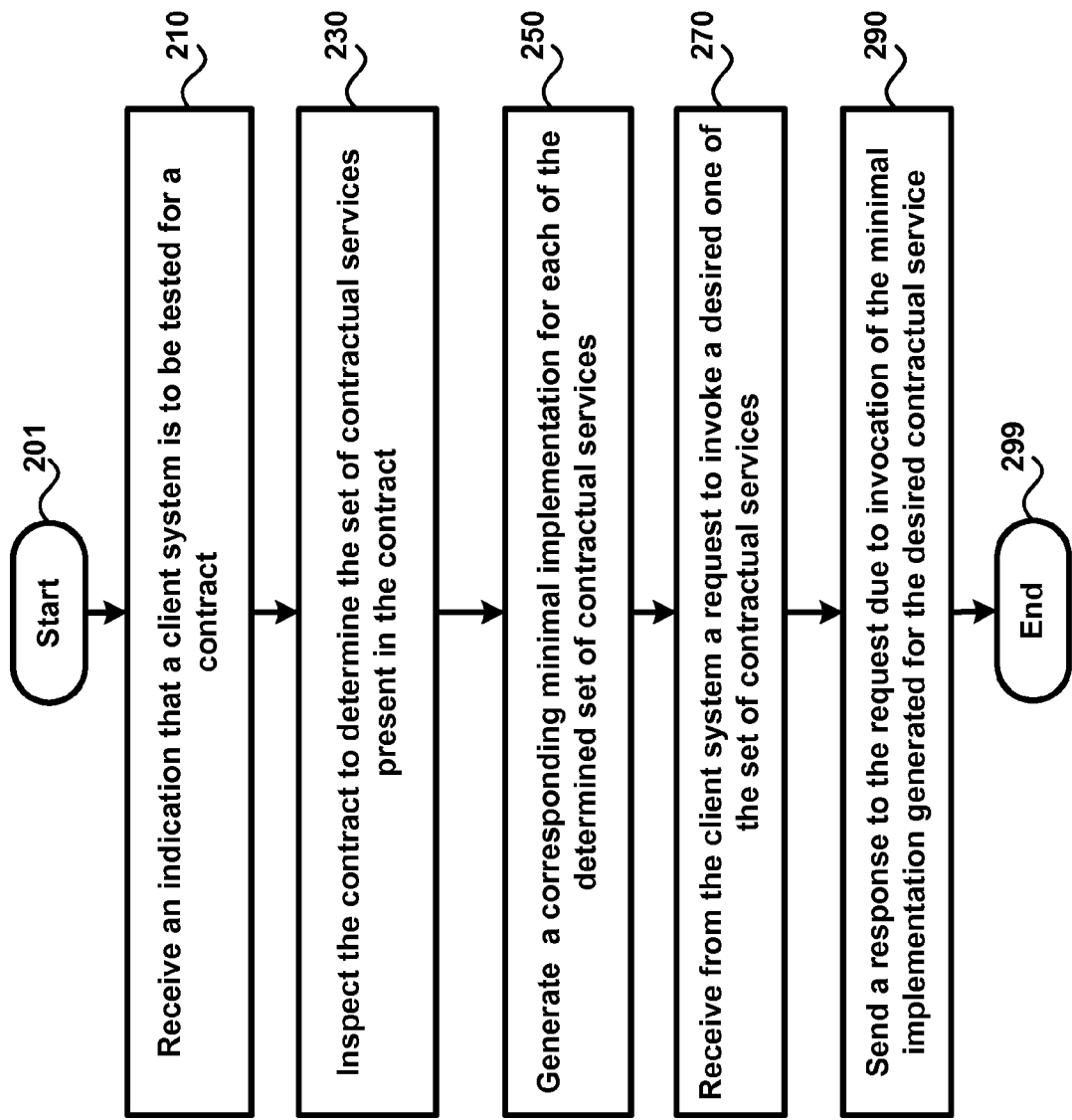
FIG. 2 is a flow chart illustrating the manner in which testing of a client system consuming contractual services is facilitated according to an aspect of the present invention.

FIG. 2 is a flow chart illustrating the manner in which testing of a client system consuming contractual services is facilitated according to an aspect of the present invention. The flowchart is described with respect to FIG. 1 merely for illustration. However, the features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, service generator 150 receives an indication that a client system (in particular client application 120) is to be tested with a contract for contractual services. The indication may be received from client application 120 or from a developer when a new server system (on which the contractual services are not yet available) is sought to be tested.

In step 230, service generator 150 inspects the contract to determine the set of contractual services present/specified in the contract. In addition, service generator 150 may also determine the set of inputs/outputs and the corresponding formats (structure, data types, restrictions, etc.) of the inputs/outputs for each of the determined set of contractual services.

In step 250, service generator 150 generates a corresponding minimal implementation for each of the determined set of contractual services. Each minimal implementation is designed to form and send a set of values respectively corresponding to the set of outputs (for the corresponding contractual service) according to the respective output formats (as defined in the contract). The set of values may be generated arbitrarily, that is, the logic underlying the production implementation in server system 140 is not used to generate the values. For examples, the values may be random values or be specified by a user using an appropriate user interface provided by service generator 150.

The minimal implementations may be generated according to the environment of the server system 160 (technology/programming language of framework 175). The generated implementations may then be deployed and hosted on framework 175 to facilitate access of the corresponding contractual services from client systems.

In step 270, framework 175 receives from the client system (110, in particular client application 120) a request to invoke a desired one of the set of contractual services (determined from the contract). The request may indicate the desired contractual service by including the URI (and also the name of the specific operation) of the desired contractual service. Framework 175 may then invoke the minimal implementation for the desired contractual service specified in the request. For example, the request may include the URI of contractual service 185 and accordingly, framework 175 may invoke the minimal implementation of contractual service 185 generated in step 250.

In step 290, framework 175 sends a response to the request due to invocation of the minimal implementation generated for the desired contractual service. For the above noted example, the invocation of contractual service 185 may cause the arbitrarily generated set of values (corresponding to the set of outputs according to respective output formats as specified in the contract) to be sent as a response to the request for invocation of contractual service 185. The flowchart ends in step 299.

Thus, client application 120 may send requests for invocation of desired ones of the set of contractual services specified in the contract (step 270) and receive corresponding responses due to invocation of the corresponding generated minimal implementations (step 290). Accordingly, the testing of client application 120 consuming the contractual services on a different server system (160) is facilitated. The manner in which the flowchart of FIG. 2 is implemented in one embodiment is described below with examples.

4. Example Implementation

FIGS. 3, 4A-4C, 5A-5B, 6A-6B, 7, 8A-8B, 9A-9D, 10A-10B together illustrates the manner in which testing of client systems consuming contractual services on different server systems is facilitated in one embodiment. Each of the Figures is described in detail below.

In the following description, it is assumed that framework 170 is both a J2EE web service stack supporting Java™ programming language for web services and a SOA process server supporting BPEL language for SOA services. Furthermore, it is assumed that the contract is according to WSDL and specifies the details of a single contractual service.

However, in alternative embodiments, contracts may be in any desired format (specifying one or more contractual services) and minimal implementations for the contractual services may be generated in any other programming environment/language (such as .NET/C#), without departing from the scope and spirit of the present invention, as will be apparent to one skilled in the relevant arts by reading the disclosure herewith.

Figure 3:
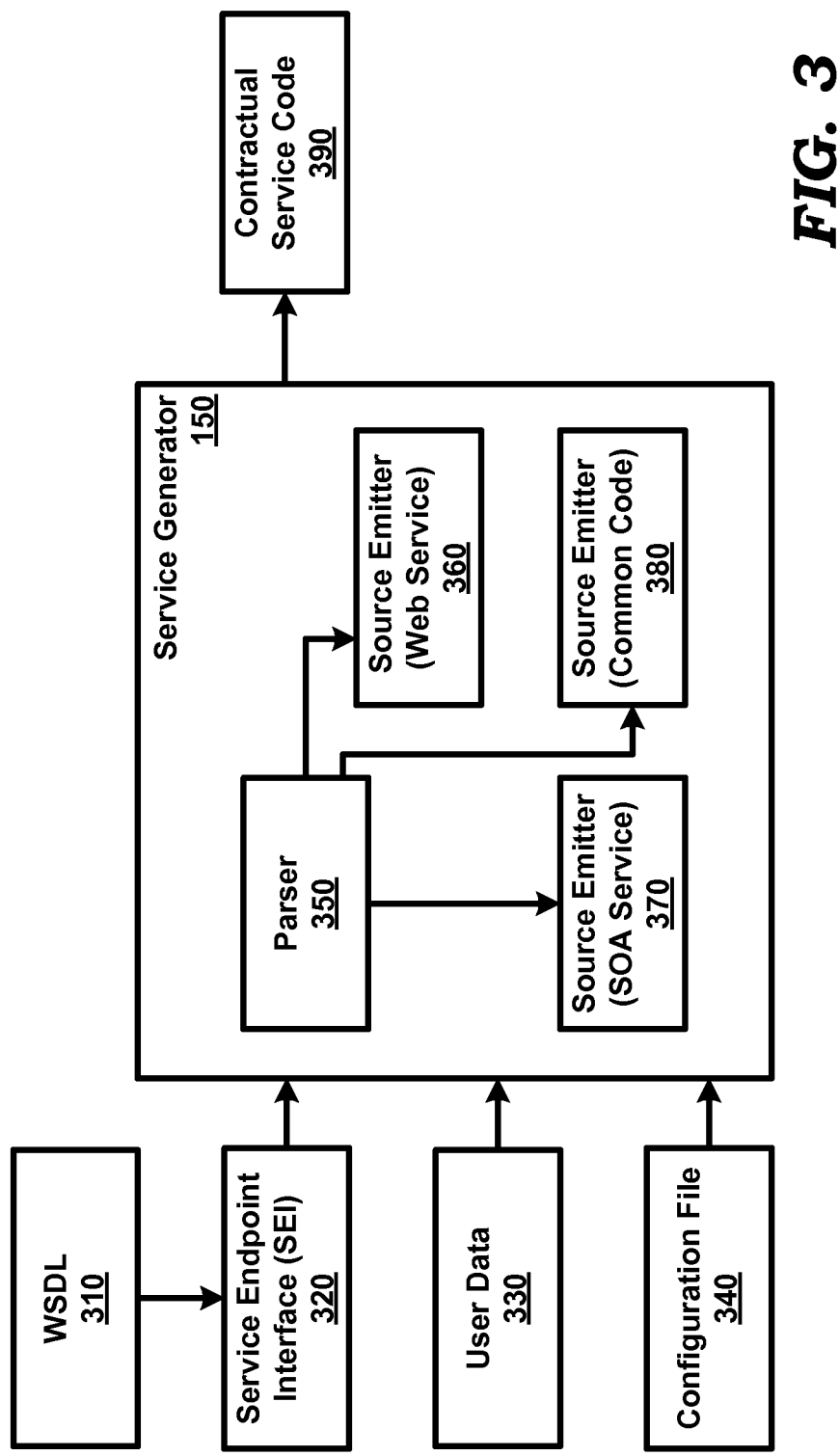
FIG. 3 is a block diagram illustrating the manner in which minimal implementations for contractual services specified by a contract are generated in one embodiment.

FIG. 3 is a block diagram illustrating the manner in which minimal implementations for contractual services specified by a contract are generated in one embodiment. The block diagram is shown containing WSDL 310, service endpoint interface (SEI) 320, user data 330, configuration file 340, parser 350, source emitters 360/370/380 and contractual service code 390. Each of the blocks is described in detail below.

WSDL 310 represents the contract for contractual services that are not yet available in server system 160. WSDL 310 is in the form of an XML document which specifies multiple contractual services that are accessible at a corresponding URI. WSDL 310 also specifies the various operations supported by each of the contractual services. WSDL 310 may be published and accessed at another URI (typically in the form of the contractual service URI appended with the text "?wsdl") over the network 130 through framework 170.

FIGS. 4A-4C together depict samples portions of an WSDL file (contract) specifying contractual services not yet available in a server system (160) in one embodiment. Lines 401-403 specify the namespaces (or context) to be used for the various tags (text in angled brackets) in the WSDL file. Line 404 specifies a reference name "OutRegParamsService" for the WSDL file and also the target namespace for newly defined tags.

Lines 405-442 specify the details of data types used in the WSDL file. In particular, each of lines 407-411 specifies a simple type/element such as "byte", "int", "anyType", etc. In lines 416-423, the details of a complex type "Employee" is specified, in particular as extending the complex type "Person" and having additional attributes "HireDate", "ID" and "Manager" (also of type "Employee"). Lines 424-429 indicate that the complex type "Person" (as well as the type "Employee") has the attributes "Name" and "Age". Similarly, lines 430-437 specify the details of the complex type "MultipleParams".

Lines 443-474 specify the formats to be used when sending requests/responses for the different contractual services specified in the WSDL file. Each format is specified by a corresponding "message" tag (from the start tag "<message>" to the corresponding end tag "</message>") and is identified by a unique name (as specified by the value of "name" in the start tag). Thus, lines 443-45 specifies a format containing a single part named "inString" of data type "String", while lines 458-467 specifies a format containing multiple parts having names such as "inSting", "inEmployee", etc. having respective data types.

Lines 476-490 (tag "portType") specify the input/output formats to be used when accessing a set of operations supported by a contractual service specified in the WSDL file (contract). Lines 492-405A (tag "binding") specify the manner (protocol to be used) in which the input/output formats for the corresponding operations are to be sent on network 130. Each operation is specified by a corresponding "operation" tag having an "input" tag indicating the input format/protocol and an "output" tag indicating the output format/protocol. The formats are specifies by referring to the names of the messages specified in lines 443-474. The value of the "parameterOrder" attribute in the input/output tags indicates the order in which the parameters are to be generated for a corresponding interface in a programming language as described below with respect to FIGS. 5A-5B.

Thus, lines 476-481 specify that a operation named "RetStringOut" receives as input the message specified in lines 443-445 (as indicated by the message name "i0IOutRefParamsService_RetStringOut_InputMessage"), that is the part "inString" and sends as output the message specified in lines 446-449, that is the parts "RestStringOut-Result" and "outString". Similarly, the input and output formats of other operations are also specified in lines 476-490. Lines 493-497 specify the protocols ("rpc" and "literal") to be used for the same operation (as indicated by the name "RetStringOut"). Similarly, the protocols to be used for the other operations are also specified based on the operation name.

Lines 406A-411A specifies that a contractual service named "OutRegParamsService" supporting the operations specified in lines 4901-405A (as indicated by the "binding" value in line 407A) is accessible (via framework 170) at the URI "http://wsipl.acme.com:8889/OutRefParamsService_RpcLit/OutRefParamsService_RpcLit".

Thus, the contract specifies that a client system/application (such as 120) wishing to invoke the contractual service "OutRegParamsService" is required to send a request (to the URI noted above) containing the name of the specific operation to be invoked (such as "RetStringOut") along with values for the inputs (such as "inString") according to the respective input formats (data type "string"). Framework 175, on receiving the request, may forward the request to the corresponding minimal implementation (generated according to several aspects of the present invention) of the contractual service "OutRegParamsService".

As noted above, framework 175 may also check that the input values specified in the request are according to the respective input formats specified in the WSDL before forwarding the request to the corresponding minimal implementation. However, in alternative embodiments, the checking of the input values (for the respective input formats) may be performed by the minimal implementations generated by service generator 150.

Service generator 150 may directly parse and inspect the WSDL of FIGS. 4A-4C to determine the set of contractual services specified in the WSDL and to generate the corresponding implementations. In one embodiment, an interface corresponding to the WSDL file of FIG. 4A-4C is first created before generation of the implementation of the contractual services as described in detail below.

5. Creating a Service Endpoint Interface

Continuing now with respect to FIG. 3, service endpoint interface (SEI) 320 represents an interface, generated specific to the programming environment/language of framework 175, which acts as a proxy for the contractual services described in WSDL 310. SEI 320 typically contains the service description in WSDL 310 in the form of structures in a programming language interface, for example as an application program interface (API). The API enables programs executing in server system 160 (such as service generator 150) to access the structures/operations described in WSDL 310 using a programming language. SEI 320 may also include instructions to receive and send requests/responses according to the protocols (such as HTTP transport, XML-based SOAP, etc.) specified in WSDL 310.

In one embodiment, a corresponding interface for each of the contractual services specified in the contract (received in step 210) is generated, with each interface containing a set of procedures corresponding to a set of operations supported by the contractual service. Each procedure in the interface includes a procedure name (generated according to the name of a corresponding operation), a set of input parameter names (generated according to the names of the inputs for the operation as determined from the contract) and a placeholder for a body of the procedure. Service generator 150 generates and places a corresponding implementation in the body of each of the set of procedures to generate the minimal implementation for the contractual service (in particular, when the contractual service is a web service).

SEI 320 may be created using a proxy generator tool such as WebServiceAssembler tool available from Oracle Corporation. Though the proxy generator tool typically generates SEI 320 specifically for web services, it may be appreciated that the same service endpoint interface (320) may be inspected to determine the services specified in the WSDL file for generation of the minimal implementations of other types of contractual services such as SOA services.

FIGS. 5A-5B together depicts sample portions of a service endpoint interface (SEI) created for a WSDL file (shown in FIGS. 4A-4C) in one embodiment. For illustration and as noted above, the software code created for SEI is shown in terms of pseudo-code similar to Java™ language (available from Sun Microsystems), well known in the relevant arts.

Line 510 indicates the package name of the SEI, while lines 502-507 specify the names of other packages (and classes) required for execution of the SEI. In lines 506 and 507, classes corresponding to the complex types "Employee" and "MultipleParams" specified in lines 416-437 of the WSDL shown in FIG. 4A-4C are shown to be required for execution. Each of the classes corresponding to the complex types contains properties corresponding to the parts specified in the message and allows values to be associated with the properties/parts. Thus, an "Employee" class may contain properties for Name, Age, HireDate, ID, Manager, etc. These classes are automatically created by the proxy generator tool and are not included here for conciseness.

Lines 509 indicates that the interface named "IOutRefParamsService" represents the contractual service/web service of the same name, line 510 indicates that a SOAP RPC binding is to be used for receiving/sending requests/responses and lines 511-512 indicates the set of classes to be used for specific XML types (such as arrays).

Lines 513-561 specify the details of the interface "IOutRefParamsService". In particular, the interface is shown containing five operations named "retStringOut" (in lines 515-519), "retIntOut" (in lines 521-525), "retByteAraryRef" (in lines 527-533), "retEmployeeOut" (in lines 534-539) and "retMultipleParams" (in lines 541-560). Only a few operations are shown for illustration, though typically the SEI will be created for all the operations and the contractual services specified in the WSDL.

Lines 515-519 specify the details of the operation "retStringOut" (as indicated by line 517). In particular, line 515 indicates that the operation is the web service operation "RetStringOut" (specified in lines 476-481 of the WSDL) and line 516 indicates that the result of the operation is the part "RetStringOutResult" (as specified by lines 479 and 447 in the WSDL). Line 518 specifies that the input parameter "inString" is associated to the part "inString" (specified by lines 477 and 444 of the WSDL), while line 519 specifies that the output parameter "outString" is associated to the part "outString" (specified by lines 479 and 448 of the WSDL). In line 519, the value of "OUT" for the mode indicates that the parameter is an output parameter, while the absence of the mode attribute indicates that the parameter is an input parameter.

Thus, for the operation "RetStringOut" specified in the WSDL, a corresponding procedure/function is created having a procedure name "retStringOut" generated according to the name of the operation, a set of input parameter names (such as "inString") generated according to the names of the inputs for the operation. It may be observed that only a placeholder (as represented by the semi-colon at the end of the procedure definition) for the body of the procedure is created. It may be appreciated that the procedures are shown including parameters for outputs, as only a single output value can be returned by a function/procedure according to Java programming language.

Similarly, functions/procedures corresponding to other operations specified in the WSDL are created as part of the service endpoint interface. It may be observed that the interface generated for the contractual service captures all the information specified in the WSDL file.

Thus, a service endpoint interface corresponding to the contract (WSDL 310) is created as the first step in generating the minimal implementations of the contractual services. The manner in which service generator 150 generates minimal implementations based on SEI 320 (shown in FIGS. 5A-5B) is described below with examples.

6. Generating Minimal Implementations

Referring again to FIG. 3, SEI 320 generated from WSDL 310 (contract) is provided as the input to service generator 150 for generating the implementations of the contractual services (not yet implemented in server system 160). WSDL 310 may also be provided as input in addition to SEI 320 in some situations, for example, to determine details about the policies specified for the contractual services, when it is required to determine the specific data type/class (e.g. string, object, etc.) to which the data type "anyType" (in line 407) is mapped in the programming language.

Service generator 150 is shown including parser 350 and a set of source emitters 360, 370 and 380 that emit/generate executable minimal implementations of contractual services for different execution environments and programming languages in server system 160. Thus, source emitter 360 is selected for generating web services implementations, source emitter 370 is selected for generating SOA services implementations, and source emitter 380 selected for generating source code that may be common to all the contractual services. Although FIG. 3 shows source emitters for web services and SOA services, it may be appreciated that the invention may be extended to other types of contractual services as well.

Furthermore, though only a single source emitter is shown as generating web service/SOA services implementations for different programming environments/languages, in alternative embodiments, service generator 150 may include separate source emitters, such as a J2EE/Java web service source emitter, a .Net/C# web service source emitter, a SOA/BPEL source emitter, etc. based on the different combinations of the type of contractual services and programming environments/languages sought to be supported by service generator 150.

Parser 350 may receive the type of source emitter to use and the location of SEI 320 (along with WSDL 310) as part of the indication received in step 210. Alternatively, the information may be specified as part of configuration file 340 as described in detail below.

FIGS. 6A-6B depicts portions of a configuration file (340) used in generating implementations of contractual services in one embodiment. The configuration file is shown specified according to XML format, though in alternative embodiments, other formats may be used for specifying the configuration information.

Line 602 (tag "compiledSEIPath") indicates the location of SEI 320, and lines 606-615 indicates the specific contractual services for which implementation are to be generated. In particular, line 608 indicates that an implementation for the contractual service "OutRefParamsService" needs to be generated. Lines 618-658 specify various policies to be enforced for the generated implementation. The detail of each policy to be enforced is specified using the tag "NormalizedPolicy".

Thus, lines 620-635 specify a policy named "WS-Addressing" (in line 628) which indicates that SOAP based addressing is to be used. Line 659 specifies the name of the package to be generated, lines 662 and 664 specifies respectively the platform "WLS1031_JAXWS" (indicating a web services stack supporting Java programming language) and the specific services stack "OC4J10131" (OAS web services stack) for which the implementation is to be generated.

Referring back to FIG. 3, parser 350 loads the specific service endpoint interface (SEI 320) based on the path specified in the configuration file 340. Parser 350 then determines the set of contractual services specified as well as the inputs/outputs (and respective input/output formats) of the operations of the determined set of contractual services. Parser 350 may then forward the determined information to the appropriate source emitter based on the indication/configuration file. Thus, for configuration file 340 shown in FIGS. 6A-6B, parser 350 forwards the determined information to source emitter 360 for generation of a web service implementation according to Java programming language (as indicated by lines 662 and 664).

According to an aspect of the present invention, source emitter 360 (for web service implementations) generates a set of values for the set of outputs for each of the contractual services arbitrarily, but according to the respective output formats. As noted above, arbitrary generation implies that the relationship between the values of the set of outputs would not have correlation with the actual values (for the same set of inputs) that would be generated once the production implementations of the web services are implemented (or made available) on the server system. In one embodiment, the set of values are generated randomly (e.g., using a random number generator) according to the respective output formats.

According to an aspect of the present invention, parser 350 provides a user interface to enable a user/developer to specify the set of values for the set of outputs for each of the contractual services. Source emitter 360 may be designed to use the user specified values instead of the random values when generating the implementation code. A sample user interface generated and the corresponding user data 330 specified by a developer is described in detail below.

Figure 7:
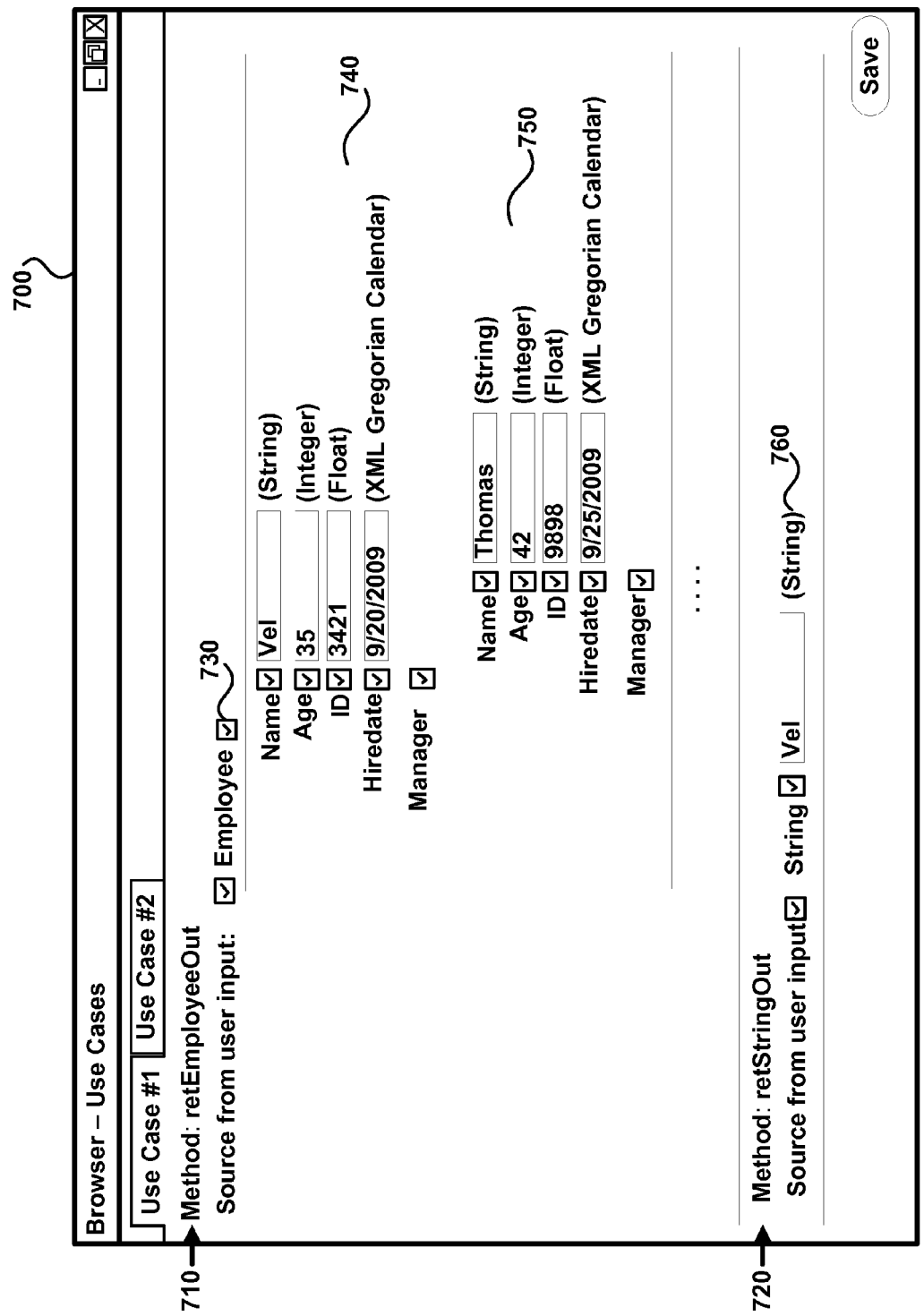
FIG. 7 depicts a sample user interface that enables developers to specify values sent as responses to requests for invocation of contractual services in one embodiment.

FIG. 7 depicts a sample user interface that enables developers to specify values sent as responses to requests for invocation of contractual services in one embodiment. Broadly, the user interface, provided by parser 350, displays the name of the procedures determined in SEI 320 (for a contractual service) along with the output parameter names, types (shown in brackets) and fields for specifying the corresponding values. The checkboxes provided alongside each procedure name and each output parameter when checked indicate that the corresponding user specified value is to be used in the response and when unchecked indicates that the corresponding value is to be generated randomly.

Display area 700 depicts a user interface in the form of a HTML page displayed using a browser on a display unit associated with server system 160. Text 710 "retEmployeeOut" and text 720 "retStringOut" indicate the names of the procedures (specified in lines 534-539 and 515-519 respectively in SEI 320) whose output/return values are sought to be specified. Checkbox 730 is shown checked indicating that the user specified values for the "Employee" object is to be sent in the response (instead of arbitrarily generated values). It may be observed that the properties of the "Employee" class are shown as individual fields in display area 740. Furthermore, the Manager property of the Employee class being of Employee type is also shown similarly expanded in display area 750.

A user/developer may specify any desired values (such as "Vel", "35", "Sep. 20, 2009", etc.) for the output parameter "Employee" for the procedure "retEmployeeOut" using display areas 740 and 750 and for the output parameter "String" for the procedure "retStringOut" using display area 760. Similarly, the developer may specify desired values for other procedures of the same/different contractual services. It may be appreciated that the user specified values would not have correlation with the actual values (for the same set of inputs) that would be generated once the production implementations of the web services are implemented (or made available) on the server system. After specifying the desired values, the developer may click button 780 (labeled "Save") to send the specified values as user data 330 to service generator 150 for generation of the minimal implementations by the corresponding source emitter.

Referring back to FIG. 3, source emitter 360 (for web services implementation) generates the corresponding minimal implementation for each of the set of contractual services determined in the contract (based on inspecting SEI 320 by parser 350). Each minimal implementation is designed to form and send a set of values (either randomly generated or user specified using the interface of FIG. 7) respectively corresponding to the set of outputs (according to the respective output formats) for the corresponding contractual service. Similarly, the implementations of other types of contractual services (such as SOA services) may also be generated by service generator 150.

Contractual service code 390 represents the source code/instructions generated by service generator 150 based on the services specified in SEI 320 (and WSDL 310). Contractual code 390 may be compiled (converted to executable form) and then deployed on framework 170 to enable client systems to access the contractual services (such as 185). After successful deployment, the client system (client application 120) sought to be tested may send requests for invocation of desired contractual services and receive corresponding responses to the requests due to the invocation of the minimal implementations generated for the contractual services. Thus, the testing of the client system consuming the contractual services specified in the contract is facilitated.

A web service implementation generated for the contractual service (185) specified by SEI 320 (shown in FIGS. 5A-5B) is first described, followed by the description of a SOA service implementation generated for the same SEI 320.

7. Web Services Implementation

FIGS. 8A-8B and 9A-9D together depicts portions of a web services implementation generated for a contractual service (as specified by the WSDL shown in FIGS. 4A-4C) not yet implemented in a server system in one embodiment. The web services implementation is shown generated in Java programming language for deployment on a J2EE web service stack.

FIGS. 8A-8B together depicts a wrapper class generated for sending responses to requests for invocation of contractual services in one embodiment. The wrapper class is shown generated only for a single contractual service specified in SEI 320 (portions shown in FIGS. 5A-5B).

Line 801 is a comment indicating that the code is generated for the web service stack "WLS1031_JAXWS" as specified in line 662 of configuration file 340 (shown in FIGS. 6A-6B). Line 82 is a comment indicating that the wrapper class is generated for the SEI named "IOutRefParamsService" shown in FIGS. 5A-5B. Lines 803 specifies the package name of the wrapper class, while lines 804-808 specify the names of other packages (and classes) required for execution of the wrapper class.

Line 810 indicates the contractual service "OutRefParamsService" for which the wrapper class is to be used as minimal implementation, while lines 813-815 specifies the protocols/bindings to be used for receiving/sending requests/responses between client systems and server system 160. Lines 816-818 specify various policies to be implemented based on the policies specified in lines 618-658 of configuration file 340. It may be observed that line 816 indicates the policy specified in lines 620-635 of the configuration file.

It may be appreciated that the protocols/bindings and/or the policies specified in the configuration file may be different from those specified in WSDL 310 (the contract). Accordingly, a new/modified contract/WSDL may be required to be generated and provided to client systems. Such a new/modified WSDL may be generated automatically using existing tools such WebServiceAssembler tool available from Oracle Corporation based on the Java classes (wrapper class, implementation class, etc.) generated as the web service implementation.

In lines 821-824, an instance (named "_impl") of the generated implementation class is created. The detail of the generated implementation class is described below with respect to FIGS. 9A-9D. Lines 826-873 specify procedures for operations similar to those shown in lines 515-560 of the service endpoint interface of FIGS. 5A-5B. Service generator 150 may determine each of the procedures in SEI 320 (e.g., using reflection, well known in J2EE/.NET type dynamic environments) and generate the corresponding procedures in the wrapper classes.

It may be observed that the placeholders (as represented by the semi-colon at the end of the procedure definition in FIGS. 5A-5B) for the body of the procedure are shown replaced by a corresponding implementation (shown between the curly brackets {}). Each of the implementations is shown invoking a corresponding named procedure of the implementation class instance "_impl" and returning the values returned by the class instance as output values for the procedure.

For example, for the procedure "retStringOut" in lines 826-835, the corresponding named procedure of the implementation instance is shown invoked in line 833 with the result of invocation stored in the variable "_ret". In line 834, the result of invocation is shown returned as the output value to be sent as a response to a request for invocation of the "RetStringOut" operation of the "IOutRefParamsService" contractual service.

The other procedures in the wrapper classes are similarly shown to be invoking the corresponding named procedures of the implementation instance "_impl" and returning the results of invocation as corresponding output values to be sent as responses to requests for invocation of corresponding procedures/operations of the "IOutRefParamsService" contractual service. Thus, the values to be sent as the response to invocation of the corresponding procedure of the contractual service are specified in the implementation class as described in detail below.

FIGS. 9A-9D together depicts an implementation class generated for contractual services in one embodiment. The implementation class is shown generated only for a single contractual service specified in SEI 320 (portions shown in FIGS. 5A-5B).

Lines 901-909 similar to lines 801-808 indicate the web service stack, the service endpoint interface "IOutRefParamsService", the package name of the implementation class, and the names of other packages (and classes) required for execution of the implementation class. In lines 911-941A, the implementation class is shown containing 5 procedures named "restStringOut", "retIntOut", "retByteArrayRef", "retEmployeeOut" and "retMultipleParams".

In particular, lines 916-920 depict the implementation of the "retStringOut" method and shows the value "PCI817k1bX" being assigned to the output parameter arg1 in line 917. A value "2" is assigned to variable "ret" in line 918 and the assigned value is returned in line 919. The two values are included in the response (for the two outputs shown in lines 447-448 in FIGS. 4A-4C) sent to the request for invocation of the operation "retStringOut". The values assigned may be randomly generated by source emitter 360 or may be specified by a user/developer using the interface shown in FIG. 7. Similarly, the implementations of the other procedures also return values (generated randomly or user specified) to be sent as responses to the requests for invocation of the corresponding contractual services (and procedures) received from client systems.

Though the implementations shown in lines 916-934 are simple, it may be observed that for the procedure "retEmployeeOut" in lines 945-996 returns an "Employee" complex type (implying that it is constituted by other variables according to a structure). Service generator 150 needs to generate values for the individual properties/parts of the "Employee" class, which in turn may also be of a complex type (for example, "Manager" property). Thus, service generator 150 needs to recursively determine the manner in which the output parameter of the "retEmployeeOut" procedure is to be generated. The recursion may proceed until all the variables are determined to be of simple types (such as integer, double, string, etc.).

Furthermore, it may be required that each of the values be qualified (by specifying appropriate attributes) for the proper transmittal of the values using web service protocols such as SOAP.

Thus, lines 944-951 together set the value "Dec. 3, 2009" (either arbitrarily generated or user specified) of the HireDate property/part of the output Employee instance as well as the various attributes qualifying the value. Similarly, lines 953-959 together set the value "14" of the ID property as well as set the attributes of the ID property. In lines 961-966, a new instance of the Employee class is created and assigned to the "Manager" property of the output Employee instance. In lines 967-977, the various properties such as "HireDate", "ID", etc. of the "Manager" Employee instance is set.

As noted above, the values for the "Manager" property of the "Manager" Employee instance is also an Employee class and accordingly may also need to be generated. The number of levels to which such a hierarchical structure of classes needs to be recursively inspected and generated may be specified in the configuration file 340 using the tag "type-MaxDepth" (as shown in line 617). Thus, according to the value "5" specified for the tag in configuration file 340, source emitter 360 may generate values for five levels of the "Manager" property of the output Employee instance class.

Lines 981-987 together set the value "25" of the "Age" property and lines 988-994 set the value "Vel" of the "Name" property of the output Employee instance. In line 995, the generated output Employee instances (containing arbitrarily generated values or user specified values) is returned as the output parameter to be sent as a response to a request for invocation of the "RetEmployeeOut" operation of the "IOutRefParamsService" contractual service.

Thus, a web service implementation for the contractual service specified in the contract (WSDL 310/SEI 320) is generated. The generated code may be compiled and deployed on framework 170 to enable testing of client systems with the contract.

It may be observed that the implementation generated contains several program statements (shown as respective lines of FIGS. 8A-8B and 9A-9D). Service generator 150 forms the program statements automatically. The term "automatically" implies that the program statements are generated programmatically (as opposed to user having to manually specify/code the same). It may be appreciated that the program statements may be formed by incorporating simple/complex data values (either arbitrarily generated by service generator 150, or provided by the user using a HTML page, as shown in FIG. 7).

While the above description is provided with respect to combination of J2EE environment and Java programming language, it may be appreciated that service generator 150 (in particular, source emitter 360) can generate the web service implementations for other combinations of environment and programming languages.

A SOA service implementation generated for the same contract (WSDL 310/SEI 320) is described below with examples.

8. SOA Services Implementation

FIGS. 10A-10B together depicts portions of a SOA services implementation generated for a contractual service (as specified by the WSDL shown in FIGS. 4A-4C) not yet implemented in a server system in one embodiment. The SOA services implementation is shown generated in BPEL (Business Process Execution language) for deployment on a SOA process server/manager. The SOA service implementation is generated by source emitter 370 in service generator 150 based on the contractual service specified in WSDL 310 (and accordingly in SEI 320).

Line 1001 specifies the name of the BPEL process while lines 1002-1003 specify the name of the namespaces (or context) to be used for the various tags (text in angled brackets) in the BPEL file. Source emitter 370 may generated lines 1001-1003 based on the lines 406A-410A in the WSDL file.

Lines 1004-1107 specify the details of the partner links (that is systems or services) with which the BPEL process interacts. In particular, line 1005 specifies that a partner link as a client of type BPEL process (that is a process that invokes the present implementation) and the role of the present BPEL process as providing the contractual service "IOutRef- ParamsService" (the name of the contractual service specified in line 406A of the WSDL). Line 1006 specifies a reference web service again providing the same contractual service (as indicated by the role) "IOutRefParamsService" (the name of the contractual service). The reference web service may be the web service implementation generated earlier by source emitter 360 or may be an already existing implementation.

According to an aspect of the present invention, both the SOA service implementation and the web service implementation (used by the SOA service implementation) for the same set of contractual services (according to the contract specified in WSDL 310) are generated by service generator 150. The generation of both S OA services and web services implementation may be desirable when interoperability of SOA/web services are sought to tested from client systems.

Lines 1008-1023 specify variables used in indicating the formats of the requests and responses sent between the partner links (in particular, client system and reference web service) and the BPEL process. It may be observed that each variable is defined as having a corresponding one of the message types specified in the WSDL file. Thus, in line 1009, the variable "OnMessage_InputVariable_0" is defined as message type "IOutRefParamsService_RetStringOut_InputMessage" whose format is specified in lines 443-445 of FIGS. 4A-4C (and which indicates that the message contains a part named "inString"). Similarly, other variables may be defined corresponding to the different message types specified in the WSDL file.

In lines 1024-1065 specifies the details of the BPEL process with the tag "sequence" indicating that the various actions are to be performed sequentially (in contrast to a "flow" tag used to indicate actions to be performed in parallel). Lines 1025-1064 specifies the details of a single action to be performed, with the tag "pick" indicating that only one of a set of actions specified within the pick tag (each set specified by the "onMessage" tag) is to be performed based on the details of the messages received by the BPEL process. Each of the set of actions specified within the pick action may be generated for the invocation of a corresponding operation specified in the contract (WSDL 310).

Accordingly, lines 1026-1034 specifies the details of an action to be performed only when a message is received (from the client partner link) for invoking the operation "RetStringOut" of the service "IOutRefParamsService" (as indicated by line 1026) with the message format corresponding to variable "OnMessage_InputVariable_0". In other words, when the message format named "IOutRefParamsService_RetStringOut_InputMessage" (as indicated by line 1027) is received, the action in lines 1026-1034 is performed. The action to be performed is specified as a sequential action (sequence tag in line 1028) and is shown containing two actions (invoke and reply).

The invoke action in lines 1029-1030 specifies that the operation "RetStringOut" of the web service "IOutRefParamsService" of the reference partner link (web service implementation) is to be invoked with the corresponding input/output formats specified in the WSDL file and the response received is to be stored as the variable "InvokeResult_OutputVariable_0". The reply action (in lines 1031-1032) specifies that a reply (that is response) is to be sent to the client partner link for the operation "RetStringOut", the reply/response containing the data received from the reference partner link (as indicated by "InvokeResult_OutputVariable_0").

Similarly, in lines 1036-1043, the actions to be performed on receiving a request (from a client system) to invoke the "RetIntOut" operation of the "IOutRefParamsService" is specified as invoking the corresponding operation in the reference web service implementation and sending a reply/response to the client system with the output generated by the invocation operation. Source emitter 370 may similarly generate the BPEL statements for the other operations such as RetEmployeeOut, RetMultipleParamsOut, etc., specified in WSDL 310.

The BPEL code generated may be deployed (either directly or after converting to a programming language such as Java) on framework 175. Framework 175 may then receive requests for invocation of the contractual service and send corresponding responses thereby enabling testing of client systems consuming contractual services on different server systems.

It may be appreciated that the minimal implementations generated by service generator 150 are end implementations, implying that the values to be sent in the response are generated and included in the instructions constituting the minimal implementations.

It should be further appreciated that the features described above can be implemented in various embodiments as a desired combination of one or more of hardware, executable modules, and firmware. The description is continued with respect to an embodiment in which various features are operative when the software instructions described above are executed.

9. Digital Processing System

Figure 11:
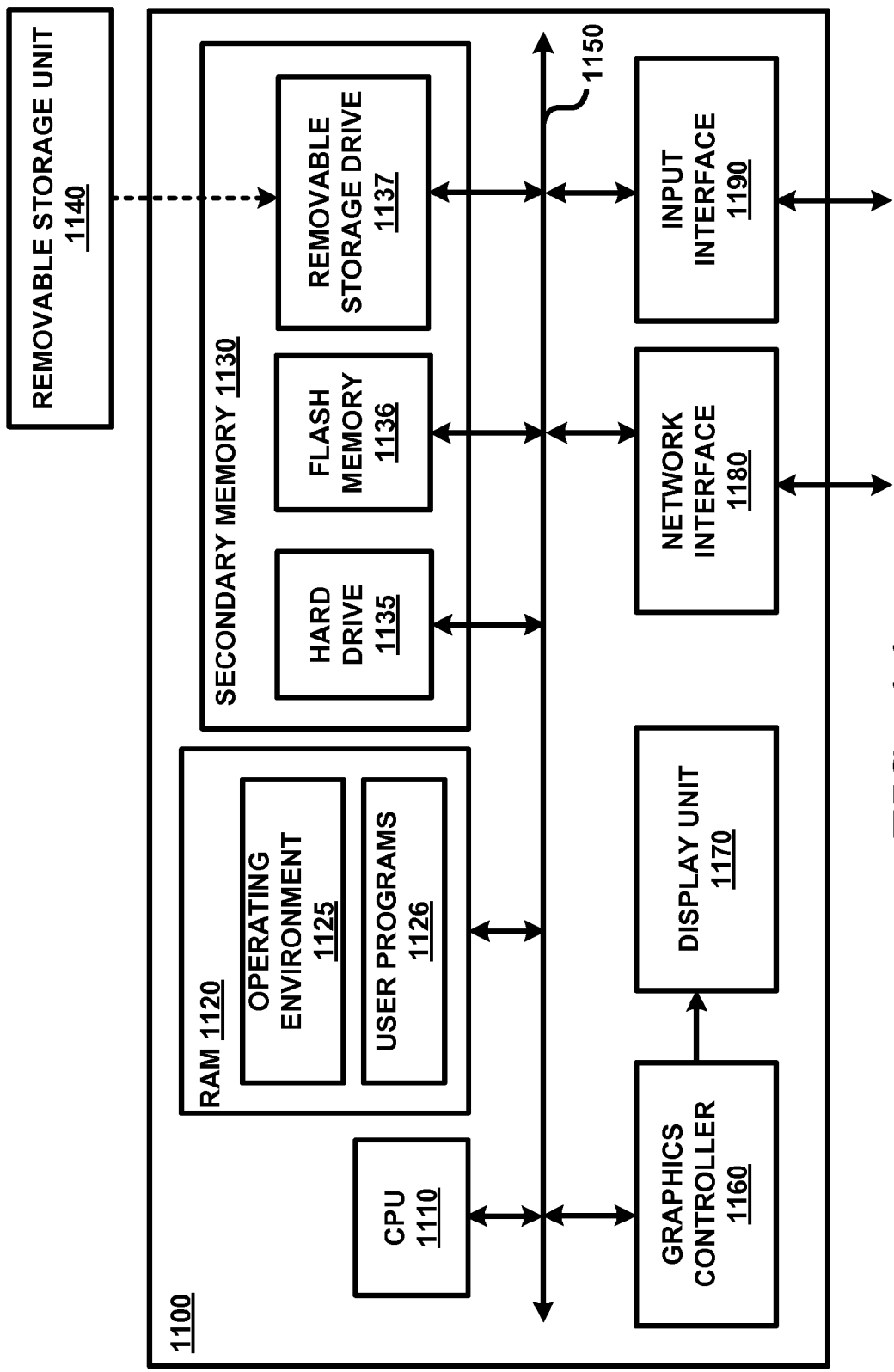
FIG. 11 is a block diagram illustrating the details of a digital processing system in which various aspects of the present invention are operative by execution of appropriate software instructions.

FIG. 11 is a block diagram illustrating the details of digital processing system 1100 in which various aspects of the present invention are operative by execution of appropriate software instructions. Digital processing system 1100 may correspond to server system 160. Digital processing system 1100 may contain one or more processors such as a central processing unit (CPU) 1110, random access memory (RAM) 1120, secondary memory 1130, graphics controller 1160, display unit 1170, network interface 1180, and input interface 1190. All the components except display unit 1170 may communicate with each other over communication path 1150, which may contain several buses as is well known in the relevant arts. The components of FIG. 11 are described below in further detail.

CPU 1110 may execute instructions stored in RAM 1120 to provide several features of the present invention. CPU 1110 may contain multiple processing units, with each processing unit potentially being designed for a specific task. Alternatively, CPU 1110 may contain only a single general-purpose processing unit.

RAM 1120 may receive instructions from secondary memory 1130 using communication path 1150. RAM 1120 is shown currently containing software instructions constituting operating system 1125 and/or other code/programs 1126 (such as client applications, Web browser, application instances processing user requests, load balancer/management applications, RDBMS, etc.). In addition to operating system 1125, RAM 1120 may contain other software programs such as device drivers, virtual machines, etc., which provide a (common) run time environment for execution of other code/programs.

Graphics controller 1160 generates display signals (e.g., in RGB format) to display unit 1170 based on data/instructions received from CPU 1110. Display unit 1170 contains a display screen to display the images defined by the display signals (for example, the user interface of FIG. 7). Input interface 1190 may correspond to a keyboard and a pointing device (e.g., touch-pad, mouse) and may be used to provide inputs (for example, user data 330 using the user interface of FIG. 7). Network interface 1180 provides connectivity to a network (e.g., using Internet Protocol), and may be used to communicate with other systems of FIG. 1 such as client system 110.

Secondary memory 1130 may contain hard drive 1135, flash memory 1136, and removable storage drive 1137. Secondary memory 1130 may store the data (for example, portions of WSDL 310, user data 330 and configuration file 340) and software instructions (for example, portions of SEI 320 and contractual service code 390 in source/compiled form), which enable digital processing system 1100 to provide several features in accordance with the present invention.

Some or all of the data and instructions may be provided on removable storage unit 1140, and the data and instructions may be read and provided by removable storage drive 1137 to CPU 1110. Floppy drive, magnetic tape drive, CD-ROM drive, DVD Drive, Flash memory, removable memory chip (PCMCIA Card, EPROM) are examples of such removable storage drive 1138.

Removable storage unit 1140 may be implemented using medium and storage format compatible with removable storage drive 1138 such that removable storage drive 1137 can read the data and instructions. Thus, removable storage unit 1140 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1140 or hard disk installed in hard drive 1135. These computer program products are means for providing software to digital processing system 1100. CPU 1110 may retrieve the software instructions, and execute the instructions to provide various features of the present invention described above.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

10. Conclusion

While various embodiments of the present invention have been described above, it should be understood that they have been presented by way of example only, and not limitation. Thus, the breadth and scope of the present invention should not be limited by any of the above -described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A server system facilitating testing of a client system consuming contractual services specified by a contract, said server system comprising:
   a processor;
   a random access memory (RAM); and
   a machine readable medium storing a first set of instructions and a second set of instructions to facilitate testing of a set of contractual services present in said contract, said set of contractual services including a first contractual service specified to send a set of outputs according to respective output formats,
   said first set of instructions containing a corresponding minimal implementation for each of said set of contractual services, wherein the minimal implementation for said first contractual service, upon execution, is designed to form a set of values respectively corresponding to said set of outputs according to said respective output formats, and
   said second set of instructions processing requests consuming contractual services in said server system, said processing comprising:
      receive in said server system, from said client system, a first request to consume said first contractual service;
      invoke, in said server system, said first contractual service as a response to said receiving of said first request, wherein invoking causes execution of the minimal implementation for said first contractual service, wherein said execution in said server system generates said set of values as said set of outputs according to said respective output formats; and
      send, from said server system to said client system, said set of values according to said respective output formats, as a response to said first request,
   wherein said first request contains a first set of input values for said first contractual service, wherein the minimal implementation is executed with said first set of input values as a set of inputs,
   wherein said set of values generated by execution of the minimal implementation for said first set of input values, are arbitrary values without correlation to the actual values that would be generated by a production implementation of said first contractual service for said first set of input values as said set of inputs,
   wherein said client system is provided as a separate system external to said server system such that multiple client systems can be tested using said server system.

2. The server system of claim 1, wherein each of said set of values is either a random value or a user-specified value.

3. The server system of claim 1, wherein said first contractual service is further specified to receive said set of inputs according to respective input formats,
   wherein said processing further comprises check in said server system that said set of inputs received in said first request is according to said respective input formats.

4. The server system of claim 3, wherein said contract is specified according to WSDL (web service definition language).

5. The server system of claim 4, wherein said set of contractual services are web services, wherein said first set of instructions and said second set of instructions are according to a programming language.

6. The server system of claim 4, wherein said set of contractual services are SOA (service oriented architecture) services, wherein said second set of instructions constitutes a SOA process server having services deployed according to BPEL (Business Process Execution Language), wherein said first set of instructions is according to said BPEL.

7. A method of facilitating testing of a client system in relation to a contract for contractual services, said method being performed at least in part in a server system, said method comprising:

inspecting said contract to determine a set of contractual services present in said contract, said set of contractual services including a first contractual service specified to send a set of outputs according to respective output formats;

generating a corresponding minimal implementation for each of said set of contractual services, wherein the minimal implementation for said first contractual service, upon execution, is designed to form a set of values respectively corresponding to said set of outputs according to said respective output formats;

receiving, in said server system, a first request from said client system to consume said first contractual service;

invoking, in said server system, said first contractual service as a response to said receiving of said first request, wherein invoking causes execution of the minimal implementation for said first contractual service, wherein said execution in said server system generates said set of values as said set of outputs according to said respective output formats; and sending, in said server system, said set of values according to said respective output formats, as a response to said first request, wherein said first request contains a first set of input values for said first contractual service, wherein the minimal implementation is executed with said first set of input values as a set of inputs, wherein said set of values generated by execution of the minimal implementation for said first set of input values, are arbitrary values without correlation to the actual values that would be generated by a production implementation of said first contractual service for said first set of input values as said set of inputs, wherein said server system comprises a processor and a memory, said processor to retrieve instructions from said memory and to execute the retrieved instructions, wherein said client system is provided as a separate system external to said server system such that multiple client systems can be tested using said server system.

8. The method of claim 7, further comprising:

receiving an indication that client systems are needed to be tested for interoperability when consuming said first contractual service present in said contract on said server system, wherein said inspecting and said generating are performed by said server system in response to said receiving of said indication, whereby the client systems are thereafter facilitated to test said first contractual service by sending said first request to said server system.

9. The method of claim 8, wherein said first contractual service is further specified to receive a set of inputs according to respective input formats, wherein said minimal implementation is executed in the context of a framework, wherein said framework is further designed to check that said set of inputs received in said first request is according to said respective input formats.

10. The method of claim 9, wherein said contract is specified according to WSDL (web service definition language).

11. The method of claim 9, wherein said set of contractual services are web services, wherein said framework is provided in a programming language, and wherein said minimal implementation is generated according to said programming language.

12. The method of claim 11, wherein said generating first generates a corresponding interface for each of said set of contractual services, and said corresponding minimal implementation according to said interface, wherein said interface for said first contractual service contains a set of procedures corresponding to a set of operations supported by said first contractual service, wherein each procedure includes a procedure name, a set of input parameter names and a placeholder for a body of the procedure, wherein said procedure name is generated according to the name of a corresponding operation of said first contractual service, and said set of input parameter names is generated according to the names of said set of inputs for the corresponding operation of said first contractual service, wherein said minimal implementation comprises said set of procedures including said body, wherein said body for each of said set of procedures contains instructions to generate arbitrarily said set of values for said set of outputs.

13. The method of claim 11, wherein said programming language of said framework is indicated by a configuration data.

14. The method of claim 13, wherein said configuration data further specifies a second set of policies to be used by said minimal implementation in place of a first set of polices specified in said contract, said method further comprising:

creating a new contract for said set of contractual services according to said second set of policies; and providing said new contract to said client system consuming said set of contractual services.

15. The method of claim 9, wherein said set of contractual services are SOA (service oriented architecture) services, wherein said framework includes a SOA process server having services deployed according to BPEL (Business Process Execution Language), wherein said minimal implementation is generated according to said BPEL.

16. The method of claim 15, wherein said first contractual service is a SOA service that consumes another set of web services.

17. The method of claim 16, wherein said generating generates said corresponding minimal implementation for said first contractual service and further generates corresponding minimal implementations for each of said another set of web services.

18. A non-transitory machine readable medium storing one or more sequences of instructions for causing a server system to facilitate testing of a client system in relation to a contract for contractual services, wherein execution of said one or more sequences of instructions by one or more processors contained in said server system causes said server system to perform the actions of:

inspecting said contract to determine a set of contractual services present in said contract, said set of contractual services including a first contractual service specified to send a set of outputs according to respective output formats;

generating a corresponding minimal implementation for each of said set of contractual services, wherein the minimal implementation for said first contractual service, upon execution, is designed to form a set of values respectively corresponding to said set of outputs according to said respective output formats;

receiving, in said server system, a first request from said client system to consume said first contractual service;

invoking, in said server system, said first contractual service as a response to said receiving of said first request, wherein invoking causes execution of the minimal implementation for said first contractual service, wherein said execution in said server system generates said set of values as said set of outputs according to said respective output formats; and sending said set of values according to said respective output formats, as a response to said first request, wherein said first request contains a first set of input values for said first contractual service, wherein the minimal implementation is executed with said first set of input values as a set of inputs, wherein said set of values generated by execution of the minimal implementation for said first set of input values, are arbitrary values without correlation to the actual values that would be generated by a production implementation of said first contractual service for said first set of input values as said set of inputs, wherein said client system is provided as a separate system external to said server system such that multiple client systems can be tested using said server system.

19. The machine readable medium of claim 18, further comprising one or more instructions for:

receiving an indication that client systems are needed to be tested for interoperability when consuming said first contractual service present in said contract on said server system, wherein said inspecting and said generating are performed by said server system in response to said receiving of said indication, whereby the client systems are thereafter facilitated to test said first contractual service by sending said first request to said server system.

* * * * *

UNITED STATES PATENT AND TRADEMARK OFFICE
CERTIFICATE OF CORRECTION

| | | |
|---|---|---|
| PATENT NO. | : 9,043,384 B2 | Page 1 of 1 |
| APPLICATION NO. | : 12/573154 | |
| DATED | : May 26, 2015 | |
| INVENTOR(S) | : Subramanian | |

It is certified that error appears in the above-identified patent and that said Letters Patent is hereby corrected as shown below:

In the specification,

In column 7, line 4, delete ""inSting","" and insert -- "inString", --, therefor.

In column 7, line 24, delete ""i0IOutRefParamsService" and insert -- "i0:IOutRefParamsService --, therefor.

In column 7, lines 26-27, delete ""RestStringOutResult"" and insert -- "RetStringOutResult" --, therefor.

In column 7, line 37, delete ""http://wsip1.acme.com:8889" and insert -- "http://wsip1.acme.com:8889 --, therefor.

In column 7, line 62, delete "FIG." and insert -- FIGS. --, therefor.

In column 8, line 47, delete "FIG." and insert -- FIGS. --, therefor.

In column 13, line 26, delete ""restStringOut"," and insert -- "retStringOut", --, therefor.

In column 13, line 30, delete "argl" and insert -- arg1 --, therefor.

In column 15, line 14, delete "S OA" and insert -- SOA --, therefor.

In column 16, line 1, delete ""RetlntOut"" and insert -- "RetIntOut" --, therefor.

Signed and Sealed this
Sixteenth Day of February, 2016

Michelle K. Lee
*Director of the United States Patent and Trademark Office*